United States Patent
Hu

(10) Patent No.: US 9,562,983 B2
(45) Date of Patent: Feb. 7, 2017

(54) GENERATING SUBTERRANEAN IMAGING DATA BASED ON VERTICAL SEISMIC PROFILE DATA

(71) Applicant: Saudi Arabian Oil Company, Dhahran (SA)

(72) Inventor: Leon Liang Zie Hu, Dhahran (SA)

(73) Assignee: Saudi Arabian Oil Company, Dhahran (SA)

( * ) Notice: Subject to any disclaimer, the term of this patent is extended or adjusted under 35 U.S.C. 154(b) by 0 days.

(21) Appl. No.: 14/473,822

(22) Filed: Aug. 29, 2014

(65) Prior Publication Data

US 2016/0061976 A1     Mar. 3, 2016

Related U.S. Application Data

(60) Provisional application No. 61/980,878, filed on Apr. 17, 2014.

(51) Int. Cl.
*G06K 9/00* (2006.01)
*G01V 1/00* (2006.01)
*G01V 1/30* (2006.01)

(52) U.S. Cl.
CPC .......... *G01V 1/30* (2013.01); *G01V 2210/161* (2013.01); *G01V 2210/51* (2013.01); *G01V 2210/586* (2013.01); *G01V 2210/63* (2013.01); *G01V 2210/671* (2013.01)

(58) Field of Classification Search
None
See application file for complete search history.

(56) References Cited

U.S. PATENT DOCUMENTS

| | | | | |
|---|---|---|---|---|
| 5,500,832 A | * | 3/1996 | Berryhill | G01V 1/301 367/50 |
| 6,035,256 A | * | 3/2000 | Stankovic | G06F 17/10 702/14 |
| 6,049,759 A | * | 4/2000 | Etgen | G01V 1/301 702/14 |
| 8,537,638 B2 | * | 9/2013 | Lee | G01V 1/368 367/73 |
| 8,756,042 B2 | * | 6/2014 | Tan | G01V 1/282 703/10 |
| 2002/0042678 A1 | * | 4/2002 | Bevc | G01V 1/303 702/18 |

(Continued)

OTHER PUBLICATIONS

International Search Report and Written Opinion of the International Searching Authority issued in International Application No. PCT/US2015/025304 on Aug. 14, 2015; 11 pages.

(Continued)

*Primary Examiner* — Wenpeng Chen
(74) *Attorney, Agent, or Firm* — Fish & Richardson P.C.

(57) ABSTRACT

Example computer-implemented method, computer-readable media, and computer system are described for generating subterranean imaging data based on vertical seismic profile (VSP) data. In some aspects, VSP data of a subterranean region can be received. Four angle attributes for each image point can be computed based on the received VSP data. Five-dimensional (5D) angle-domain common-image gathers (ADCIG) can be generated according to a ray-equation method based on the four angle attributes.

22 Claims, 15 Drawing Sheets
(11 of 15 Drawing Sheet(s) Filed in Color)

(56) References Cited

U.S. PATENT DOCUMENTS

| | | | |
|---|---|---|---|
| 2002/0049540 A1* | 4/2002 | Bevc | G01V 1/303 702/2 |
| 2003/0130796 A1* | 7/2003 | Wiggins | G01V 1/282 702/14 |
| 2005/0088913 A1* | 4/2005 | Lecomte | G01V 1/282 367/51 |
| 2008/0109168 A1* | 5/2008 | Koren | G01V 1/32 702/16 |
| 2008/0130411 A1* | 6/2008 | Brandsberg-Dahl | G01V 1/28 367/57 |
| 2009/0257308 A1* | 10/2009 | Bevc | G01V 1/303 367/53 |
| 2009/0296524 A1* | 12/2009 | Meier | G01V 1/284 367/38 |
| 2010/0114494 A1* | 5/2010 | Higginbotham | G01V 1/28 702/16 |
| 2010/0118653 A1* | 5/2010 | He | G01V 1/303 367/57 |
| 2010/0118654 A1* | 5/2010 | He | G01V 1/44 367/57 |
| 2010/0135115 A1* | 6/2010 | Sun | G01V 1/303 367/75 |
| 2010/0220895 A1* | 9/2010 | Koren | G01V 1/345 382/109 |
| 2011/0103187 A1* | 5/2011 | Albertin | G01V 1/28 367/73 |
| 2012/0020186 A1* | 1/2012 | Luo | G01V 1/28 367/21 |
| 2012/0092962 A1 | 4/2012 | Nichols et al. | |
| 2012/0095690 A1* | 4/2012 | Higginbotham | G01V 1/28 702/18 |
| 2012/0218861 A1* | 8/2012 | Xia | G01V 1/303 367/73 |
| 2012/0241166 A1* | 9/2012 | Sun | G01V 1/30 166/369 |
| 2012/0275268 A1 | 11/2012 | Tang et al. | |
| 2012/0281501 A1* | 11/2012 | Osypov | G01V 3/38 367/73 |
| 2013/0185032 A1* | 7/2013 | Archer | G06F 17/5009 703/2 |
| 2013/0265852 A1* | 10/2013 | Nichols | G01V 1/28 367/73 |
| 2014/0133275 A1* | 5/2014 | Guan | G01V 1/301 367/53 |
| 2014/0200813 A1* | 7/2014 | Montel | G01V 1/303 702/14 |
| 2014/0226437 A1* | 8/2014 | Chambers | G01V 1/36 367/7 |
| 2014/0301165 A1* | 10/2014 | Nichols | G01V 1/303 367/52 |
| 2015/0078124 A1* | 3/2015 | Lu | G01V 1/36 367/7 |
| 2015/0185349 A1* | 7/2015 | Martinez | G01V 1/362 702/17 |
| 2015/0253444 A1* | 9/2015 | Hu | G01V 1/282 702/14 |

OTHER PUBLICATIONS

Koren, Zvi et al.; "Full-Azimuth Subsurface Angle Domain Wavefield Decomposition and Imaging Part 1: Directional and Reflection Image Gathers"; Society of Exploration Geophysics; Geophysicists, US, vol. 76, No. 1; Jan. 1, 2011; pp. S1-S13.

Ravve, Igor et al.; "Full-Azimuth Subsurface Angle Domain Wavefield Decomposition and Imaging: Part 2—Local Angle Domain"; Society of Exploration Geophysics; Geophysicists, US, vol. 76, No. 2; Mar. 1, 2011; pp. S51-S64.

Zhang, Yu et al.; "Angle Gathers from Reverse Time Migration"; The Leading Edge; Nov. 2010; pp. 1364-1371.

* cited by examiner

GENERATING SUBTERRANEAN IMAGING DATA BASED ON VERTICAL SEISMIC PROFILE DATA

TECHNICAL FIELD

This disclosure relates to structure imaging and obtaining subsurface information for a subterranean region (e.g., a region from which hydrocarbons can be extracted) based on seismic data acquired in a borehole.

BACKGROUND

Seismic migration is a data-processing technique that creates an image of earth structure from the data recorded by a seismic reflection survey. Seismic migration geometrically relocates seismic events that are in space and time to the location the event occurred in the subsurface of the earth, thereby creating an image of the subsurface. Some example migration methods include, for example, zero-offset migration, pre-stack migration, finite difference migration. As an example, Pre-Stack Depth Migration (PSDM)) is a migration method for high resolution imaging of seismic data acquired either from earth's surface or within single or multiple boreholes.

SUMMARY

This disclosure relates to structure imaging and obtaining subsurface information based on borehole seismic data acquired from 3D vertical seismic profiling (VSP) surveys for reservoir analysis of a subterranean region.

In general, example innovative aspects of the subject matter described here can be implemented as a computer-implemented method, implemented in a computer-readable media and/or implemented in a computer system, for generating subterranean imaging data based on vertical seismic profile (VSP) data. VSP data of a subterranean region can be received. Four angle attributes for each image point can be computed based on the received VSP data. Five-dimensional (5D) angle-domain common-image gathers (ADCIG) can be generated according to a ray-equation method based on the four angle attributes.

This, and other aspects, can include one or more of the following features. The ray-equation method can include Kirchhoff integral method. In some instances, a multi-parameter Green's function can be computed based on ray-tracing. In some instances, ray parameters can be computed based on gradients of travel time fields computed based on the VSP data, and the four angle attributes for each image point can be computed based on the ray parameters. The four angle attributes for each image point can include a reflection-angle, an azimuth-angle of each reflection-angle, a dip-angle of each reflection-azimuth angle pair, and an azimuth-angle of each dip-angle for each reflection-azimuth angle pair.

In some aspects, multi-parameter tables for the Green's function can be generated in separated files for imaging multi-component data. In some instances, travel time shadow zones can be infilled based on a ray-tracing algorithm. In some aspects, mode-converted energy PS-data can be migrated in a time domain to avoid depth-to-time conversion in a post-processing process.

In some aspects, the generated ADCIG can be post-processed to enhance structure images. Post-processing the generated ADCIG can include one or more of imaging down-going energies, imaging up-going energies, or imaging multi-component data. The multi-component data can include one or more of PP-data, SS-data, or PS-data. In some instances, post-processing the generated ADCIG can include performing interpretation-based post-processing based on one or more of horizon picks from surface seismic data or reflection angles estimated from well-logs or ray-based modeling methods.

While generally described as computer-implemented software embodied on tangible media that processes and transforms the respective data, some or all of the aspects may be computer-implemented methods or further included in respective systems or other devices for performing this described functionality. The details of these and other aspects and implementations of the present disclosure are set forth in the accompanying drawings and the description below. Other features and advantages of the disclosure will be apparent from the description and drawings, and from the claims.

BRIEF DESCRIPTION OF THE DRAWINGS

The patent or application file contains at least one drawing executed in color. Copies of this patent or patent application publication with color drawing(s) will be provided by the Patent and Trademark Office upon request and payment of the necessary fee.

Like reference numbers and designations in the various drawings indicate like elements.

DETAILED DESCRIPTION

Figure 1:
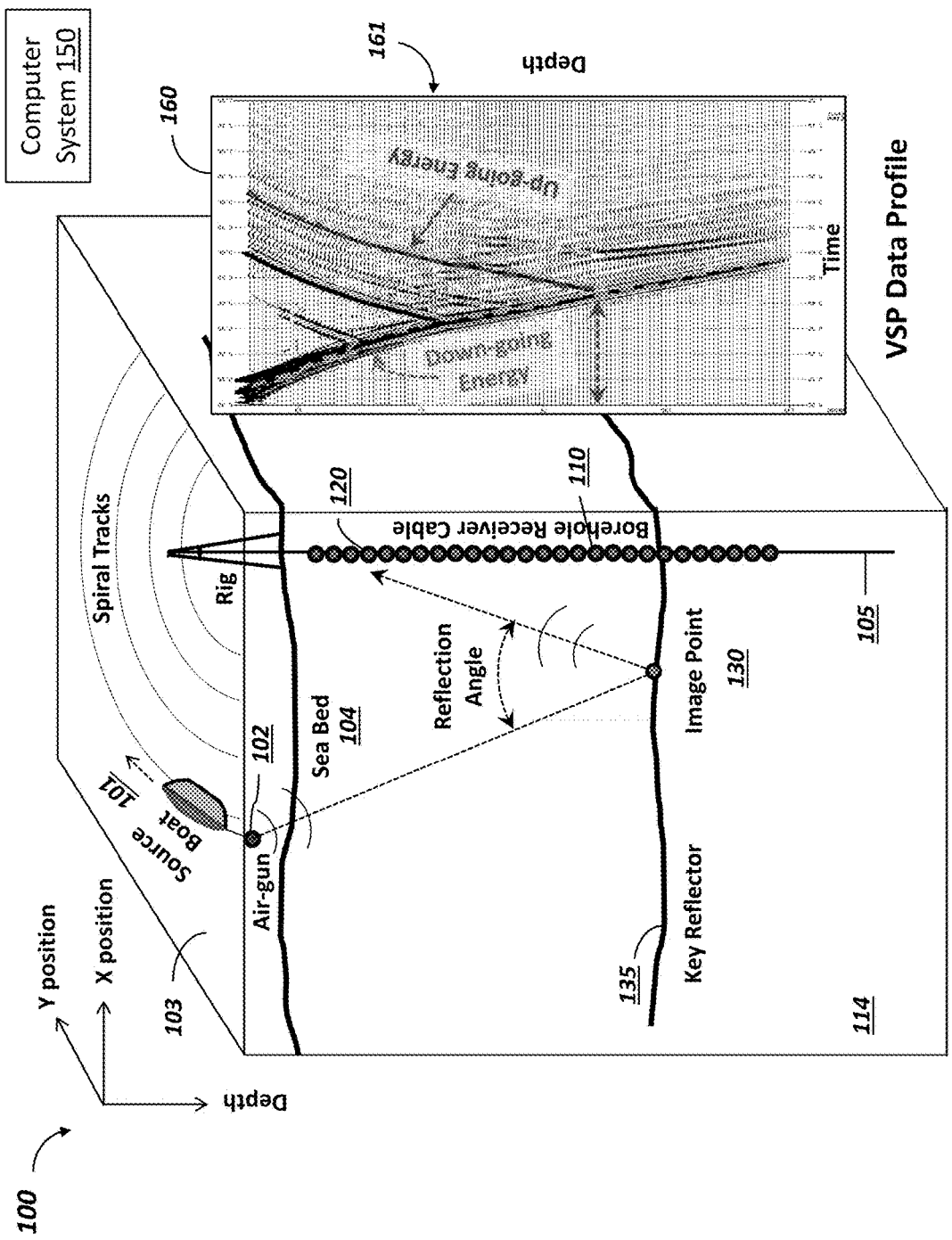
FIG. 1 is a diagram showing an example well survey system and a computer system.

This disclosure describes computer-implemented methods, software, and systems for generating angle-domain common-image gathers (ADCIG) from multi-component three-dimensional (3D) vertical seismic profile (VSP) data for structure imaging and to obtain subsurface information for reservoir analysis. For example, the structure imaging can be used to analyze location and geology of reservoirs that contain hydrocarbons and can be used to design drilling process for placing wellbores in the earth to maximize oil or gas production. Unlike surface seismic data that results from a seismic wave source and a receiver that are both on the surface (e.g., sea surface or ground surface), the VSP data results from either a borehole source, a borehole receiver, or both. For example, the VSP data can be acquired in a borehole. By moving the receiver (e.g., geophones) down into a borehole away from shallow layers, the collected VSP data can avoid various near surface challenges encountered by surface seismic surveys and thus have less noisy and distorted reflections.

Analysis of high resolution VSP data is more advantageous than surface seismic data. For example, for VSP data, wavelets for deconvolution and inversion can be extracted directly from the recorded waveform; anisotropy parameters can be estimated from the multi-component data; and the average velocity above the borehole geophones can be measured directly. For improved subsurface structural imaging, wide azimuth and offset, 3D VSP data can be collected by placing large numbers of surface shots around, and away from, the receiving borehole.

The example techniques described herein relate to generating ADCIG from the multi-component 3D VSP data. The ADCIG generation method can be based on Kirchhoff integral method. The ADCIG generation method can include computation of five-dimensional (5D) ADCIG at each image point and computation of Green's function based on ray-tracing. The multi-attribute angle gathers represent seismic images as function of (1) reflection-angle at each subsurface point, (2) corresponding azimuth-angle of each reflection-angle, (3) dip-angle of each reflection-azimuth angle pair, and (4) azimuth-angle of each dip-angle for each reflection-azimuth angle pair.

Generated ADCIG can be post-processed, for example, for enhancement of structure images, separation of images for up- and down-going waves for enhancing shallow reflections, imaging mode-converted data such as PS mode-converted energies with improved resolution, improving irregular subsurface illumination, target-oriented structure enhancements, or other applications. Example post-processing techniques of ADCIG can be based on horizon picks from surface seismic data, reflection angles estimated from well-logs and ray-based modeling methods, or other information and techniques.

In some implementations, the techniques described herein allow detailed processing of the VSP data and can affect exploration and drilling decisions if needed. The techniques can help obtain high resolution structure images and estimated elastic parameters, and, in turn, help optimize the placement of horizontal wells to maximize recovery, and minimize the drilling of dry holes. For instance, the techniques described herein can help delineation of stringer sands in offshore reservoir fields and support horizontal drilling project by providing not only high resolution images but also angle attributes for quantitative reservoir analysis. The techniques can be applied in stringer sands fields or any other reservoir fields and can support other exploration and development activities. Additionally, the techniques can be applied to image faults and major fracture systems near boreholes with spatial resolution that cannot be easily obtained via the surface seismic measurements. Moreover, the techniques can be applied for imaging salt-flanks and subsalt sediments with either single of multiple borehole measurements for either borehole source or surface source configurations.

FIG. 1 is a diagram showing an example well survey system 100 and a computer system 150. The example well survey system 100 and computer system 150 can be used to acquire 3D VSP data. In the illustrated example, the well survey system 100 is located offshore over a sea bed 104 for acquiring marine 3D VSP data. A well survey system can also be implemented on the land or in another subterranean region.

The computer system 150 can include one or more computing devices or systems. The computer system 150 or any of its components can be located apart from the other components shown in FIG. 1. For example, the computer system 150 can be located at a data processing center, a computing facility, or another suitable location. The well survey system 100 can include additional or different features, and the features of the well survey system can be arranged as shown in FIG. 1 or in another configuration.

The example well survey system 100 includes a source vehicle 101 (e.g., a boat) carrying navigation equipment and an energy source 102 (e.g., a seismic air-gun). A borehole 105 is formed in the sea bed 104 beneath the sea surface 103. Multiple receivers 120, e.g., geophones, are assembled in a wire-line cable 110 deployed in the borehole 105. The example borehole 105 shown in FIG. 1 includes a vertical borehole. However, a well survey system may include any combination of horizontal, vertical, slant, curved, or other borehole orientations. The well survey system 100 can include additional or different components.

By firing the air-gun energy beneath the ocean surface 103, acoustic waves can travel through solid earth 114, be reflected by a seismic reflector (also known as, a reflection point or an image point) 130 from layer boundaries 135, and recorded by borehole receivers 120. The subplot 161 of FIG. 1 illustrates example recorded VSP data 160 that shows both down-going and up-going energies that can be imaged in angle domain using the reflection-angle attribute. In some implementations, the VSP data 160 can be acquired in various depth levels along the borehole 105. In general, seismic reflectors near the borehole 105 are illuminated with fewer angles than those reflectors with far offsets.

Compared with surface seismic data recorded based on seismic waves originated from a source and a receiver that are both located on the surface (e.g., sea surface 103 or a ground surface), VSP data can have less noise and higher fidelity, and can be analyzed for reservoir properties via imaging, modeling and inversion for various seismic attributes. In some implementations, unlike the surface seismic data migration, VSP geometry requires the VSP data 160 to be migrated with wide angle attributes. The angle attributes can include, for example, (1) reflection angle with values (min, max)=(0° ~90°), (2) reflection azimuth angle with values (min, max)=(0° ~360°), (3) absolute dip angle with values (min, max)=)(0° ~180° and (4) dip azimuth angle with values (min, max)=(0° ~360°).

Figure 2:
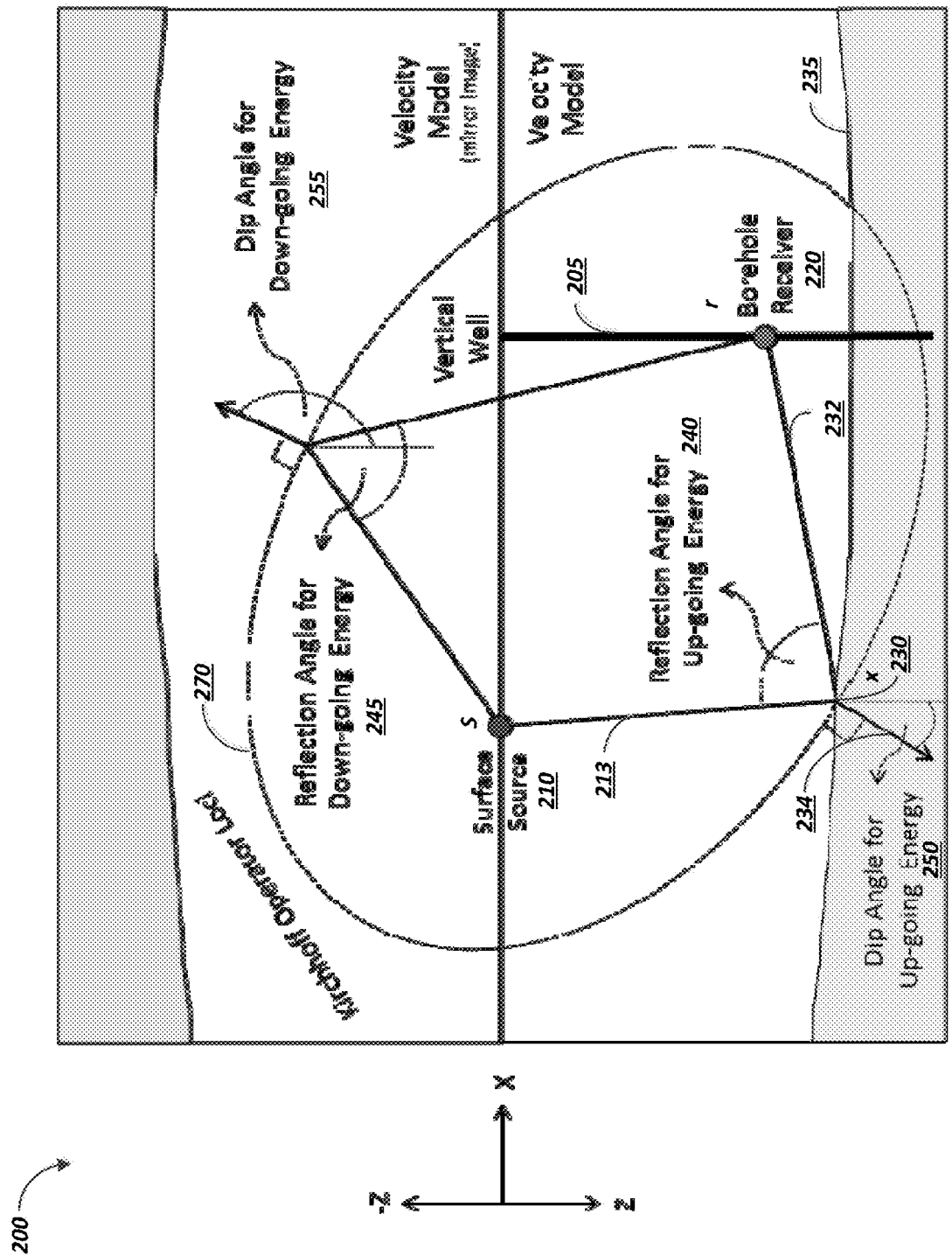
FIG. 2 is a diagram showing example angle attributes of the VSP data.

FIG. 2 is a diagram 200 showing example definitions of angle attributes of the VSP data. FIG. 2 shows a surface source (S) 210, a receiver (r) 220 located in a borehole 205, and a reflector or image point (x) 230. In some implementations, the surface source 210, the borehole receiver 220, and the image point 230 can represent the source vehicle 101 including the energy source 102, the borehole receiver 120, and the reflector 130 from layer boundaries 135, respectively. The surface source 210, the borehole receiver 220, and the image point 230 can represent other sources, receivers, and reflectors in other implementations.

The locations of the surface source 210 and borehole receiver 220 can be represented by (Xs, Xr). The travel time from the surface source 210 to the borehole receiver 220 can be represented by t. Unlike wave-equation methods (e.g., Reverse Time Migration method), Kirchhoff-integral method is a ray-equation method. The Kirchhoff migration algorithm can include two main steps: (1) to compute travel time tables (i.e., Green's function g(x, t) in Equation (1)) for all source and receiver positions (Xs, Xr) with ray-tracing and (2) to distribute amplitudes of input seismic data D(Xs, Xr, t) along the total travel time trajectories as defined in step 1, and then accumulate these for every image points I(x) in the subsurface as shown in Equation (1). The function W(x,t) is for amplitude compensation.

$$I(x) = \Sigma_{X_s} \Sigma_{X_r} W(x,t) D(X_s, X_r; t) g[t(X_s, x) + t(X_r; x)] \quad (1)$$

In some instances the total travel time trajectory is an elliptical function (e.g., shown as an ellipse 270 in FIG. 2) whenever the medium velocity is constant; however, it may have irregular shape when encountering complex velocity media.

FIG. 2 shows an incident ray 213 from the surface source 210 to the reflector 230, and a reflection ray 232 from the reflector 230 to the borehole receiver 220. The geometry of the seismic waves can define the angle attributes of the VSP data. For example, a reflection angle 240 can be defined as the opening angle between the incident ray 213 and the reflection ray 232. A dip angle 250 can be defined as the angle between the vertical depth direction (i.e., the z-axis) and the normal 234 to the elliptical surface 270 at the image point 230. In some implementations, extension of the dip angle that is beyond 90° enables free surface multiples (i.e., down-going energy) to be migrated together with the up-going reflections by using different dip-angle ranges of the same operator. For example, FIG. 2 shows a reflection angle 245 and a dip angle 255 (larger than 90°) for down-going energy that correspond to the reflection angle 240 and the dip angle 250 for the up-going energy.

In some implementations, the angle attributes can be derived based on ray-parameters directly from the ray-path. Alternatively, ray-parameters can be estimated from the gradient of travel time fields. In some instances, full wave fronts/rays field can be traced from the surface (e.g., the reflection layer 235) for every subsurface image point and interpolated for every source and receiver pairs via interpolation. Additional or different techniques can be used to calculate the angle attributes.

Figure 3:
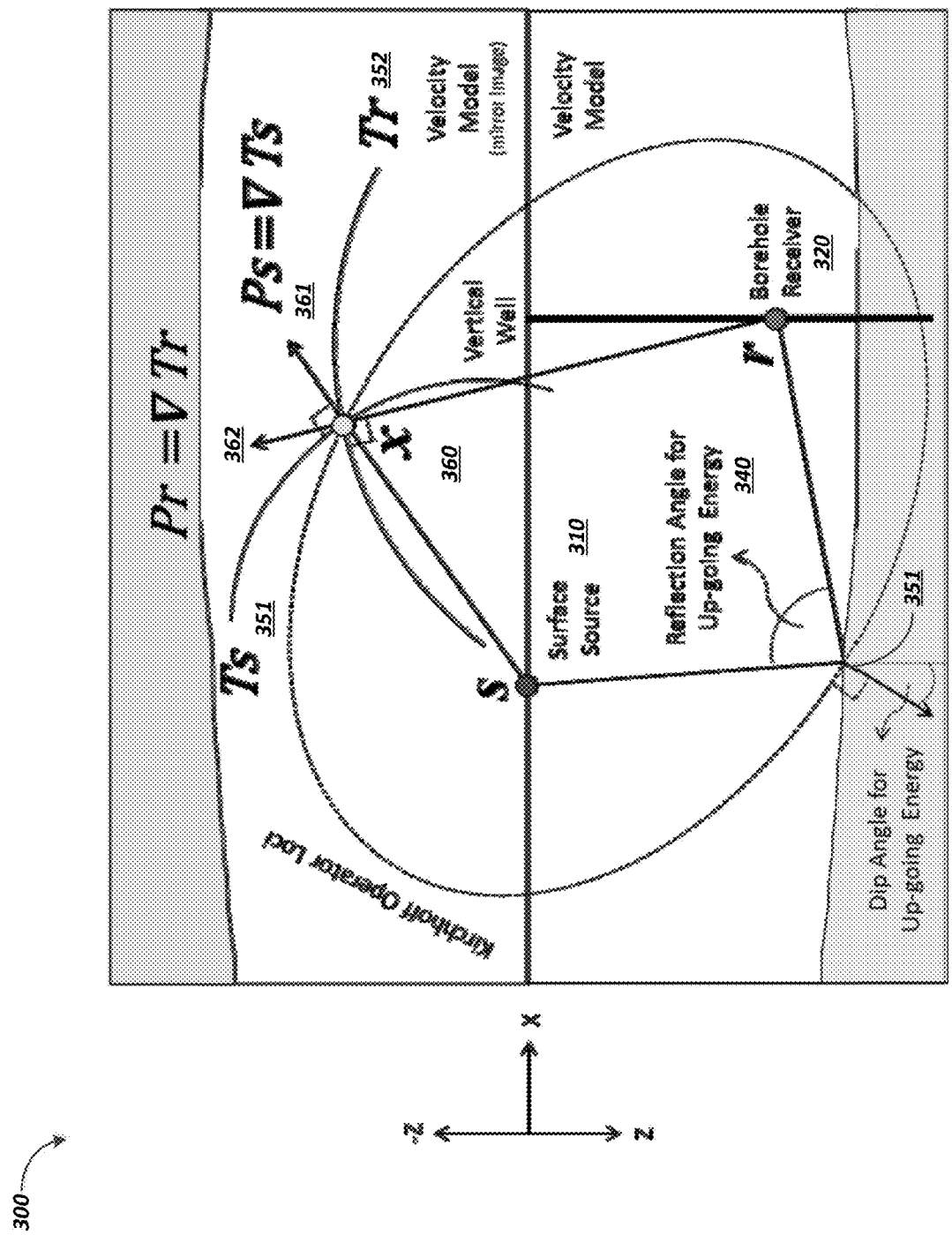
FIG. 3 is a diagram showing an example method of computing opening angles with ray parameters that are estimated with the travel time fields.

FIG. 3 is a diagram 300 showing example method of computing reflection angles (or opening angles) with ray parameters that are estimated with the travel time fields. For example, the unit vector (ray parameter) Ps from a source (S) 310 to a mirror image point (x) 360 can be obtained from the gradient of a source travel time Ts 351 at position (x) 360 as Ps=∇Ts. The unit vector (ray parameter) Pr from a receiver (r) 320 to the same mirror image point (x) 360 can be obtained from the gradient of a receiver travel time Tr 352 at position (x) 360 as Pr=∇Tr. Applying the inner product rule between these two vectors Ps 361 and Pr 362, the reflection angle 360 can be derived.

Figure 4:
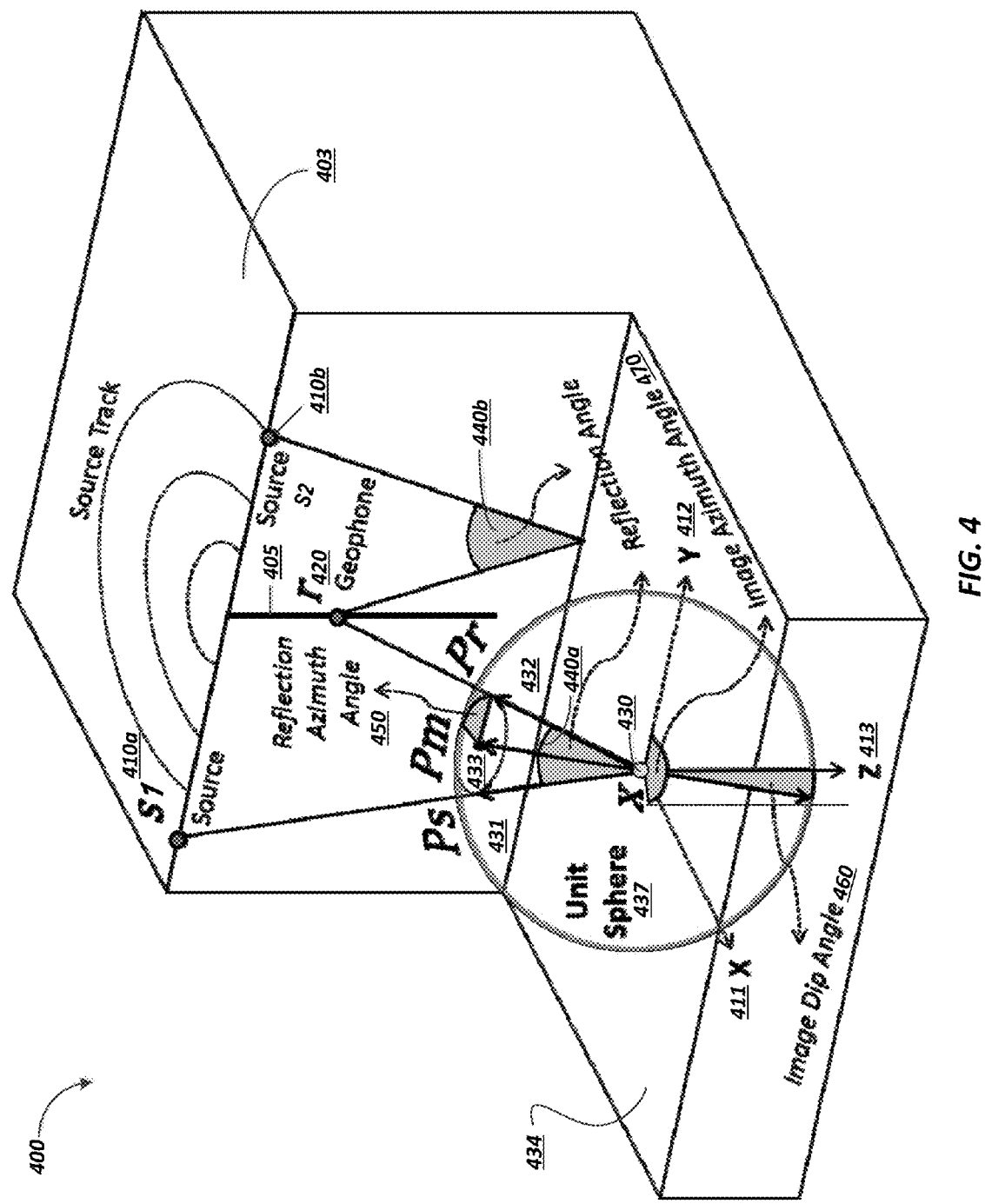
FIG. 4 is a diagram showing example angle attributes for the VSP data.

FIG. 4 is a diagram 400 showing example angle attributes for the VSP data in a 3D perspective. As illustrated, FIG. 4 includes two sources (S1) 410a and (S2) 410b and a downhole geophone receiver (r) 420 located in a borehole 405. The two sources (S1) 410a and (S2) 410b are located on a surface 403 (e.g., the sea surface 103 in FIG. 1, a ground surface, etc.) and emit energy beneath the surface 403. FIG. 4 shows an image point (X) 430 is located on a reflection layer 434 and a unit sphere 437 centered at the image point (X) 430. Ray parameter Ps 431 is the unit vector at the image point (X) 430 directing to the surface source (S1) 410a, and ray parameter Pr 432 is a unit vector directing to the borehole receiver (r) 420. The two ray parameters Ps 431 and Pr 432 can be derived, for example, based on the gradient of two travel time fields as described with respect to FIG. 3.

The angle attributes of the image point (X) 430 include a reflection angle 2θ 440a, an azimuth angle 450 of the reflection-angle 440a, a dip-angle 460, and an azimuth-angle 470 of the dip-angle 460; all four angles are shown in shaded areas in FIG. 4. The angle attributes can be defined and obtained, for example, based on the obtained ray parameters Ps 431 and Pr 432 and the coordinates (x, y, z) of the image point (X) 430. Here the z-axis 413 is the vertical or depth axis and x-axis 411 and y-axis 412 are two orthogonal horizontal axes spanning in the surface 403. In some implementations, the y-axis 412 can be the inline direction while the x-axis 411 can be the cross-line (x-line) direction, or vice versa, or any other appropriate directions.

The reflection angle 2θ 440a can be defined as the opening angle between the source ray parameter Ps 431 and the receiver ray parameter Pr 432. For instance, the reflection angle 2θ 440a can be obtained based on the inner product of ray parameters Ps 431 and Pr 432 according to Equation (2). Equation (3) defines a midpoint ray parameter Pm 433 that is the unit vector of the vector sum Ps+Pr. The azimuth angle α 450 of the reflection-angle 440a can be defined as the angle formed by two normal vectors. One normal vector is normal to the plan spanned by ray parameters Ps 431 and Pr 432; while the other normal vector is normal to the midpoint ray parameter Pm 433 and the y-axis 412 (e.g., the inline axis). As an example, the azimuth angle α 450 of the reflection-angle 2θ 440a can be obtained based on the inner-product of the cross-product vector (Pr×Ps) and the cross-product vector (Pm×y), according to Equation (4). The dip-angle ϕ 460 can be defined as the angle formed by the depth direction (i.e., z-axis) and the midpoint ray parameter Pm 433, and can be obtained based on the inner product of Pm 433 and z-axis 413 according to Equation (5). The azimuth-angle β 470 of the dip-angle ϕ 460 can be defined as the angle formed by the y-axis 412 with the unit normal vector to the plane spanned by the z-axis 413 and the midpoint ray parameter Pm 433. The azimuth-angle β 470 can be obtained based on the inner and cross-product rules according to Equation (6). In some other implementations, additional or different techniques can be used to compute the angle attributes of the VSP data.

With the four angle attributes, the VSP data can be organized in a five-dimensional (5D) image space with axes of (reflection, reflection-azimuth, dip, dip-azimuth, depth). For instance, a five-dimensional data cube (θ, α, ϕ, β, z) for the image point (x) 430 can be obtained based on Equations (2)-(6). The ADCIG can contain group of imaged seismic traces at each (x, y, z) location showing reflection amplitudes as function of the four angle attributes.

$$\cos(2\theta) = \frac{Ps \cdot Pr}{|Ps||Pr|}, \quad (2)$$

$$Pm = \frac{Ps + Pr}{|Ps + Pr|}, \quad (3)$$

-continued $$\cos(\alpha) = \frac{(Pm \times y) \cdot (Pr \times Ps)}{|Pm \times y||Pr \times Ps|}, \quad (4)$$

$$\cos(\phi) = \frac{Pm \cdot z}{|Pm||z|}, \quad (5)$$

$$\cos(\beta) = \frac{(z \times Pm) \cdot y}{|z \times Pm||y|}. \quad (6)$$

Figure 5:
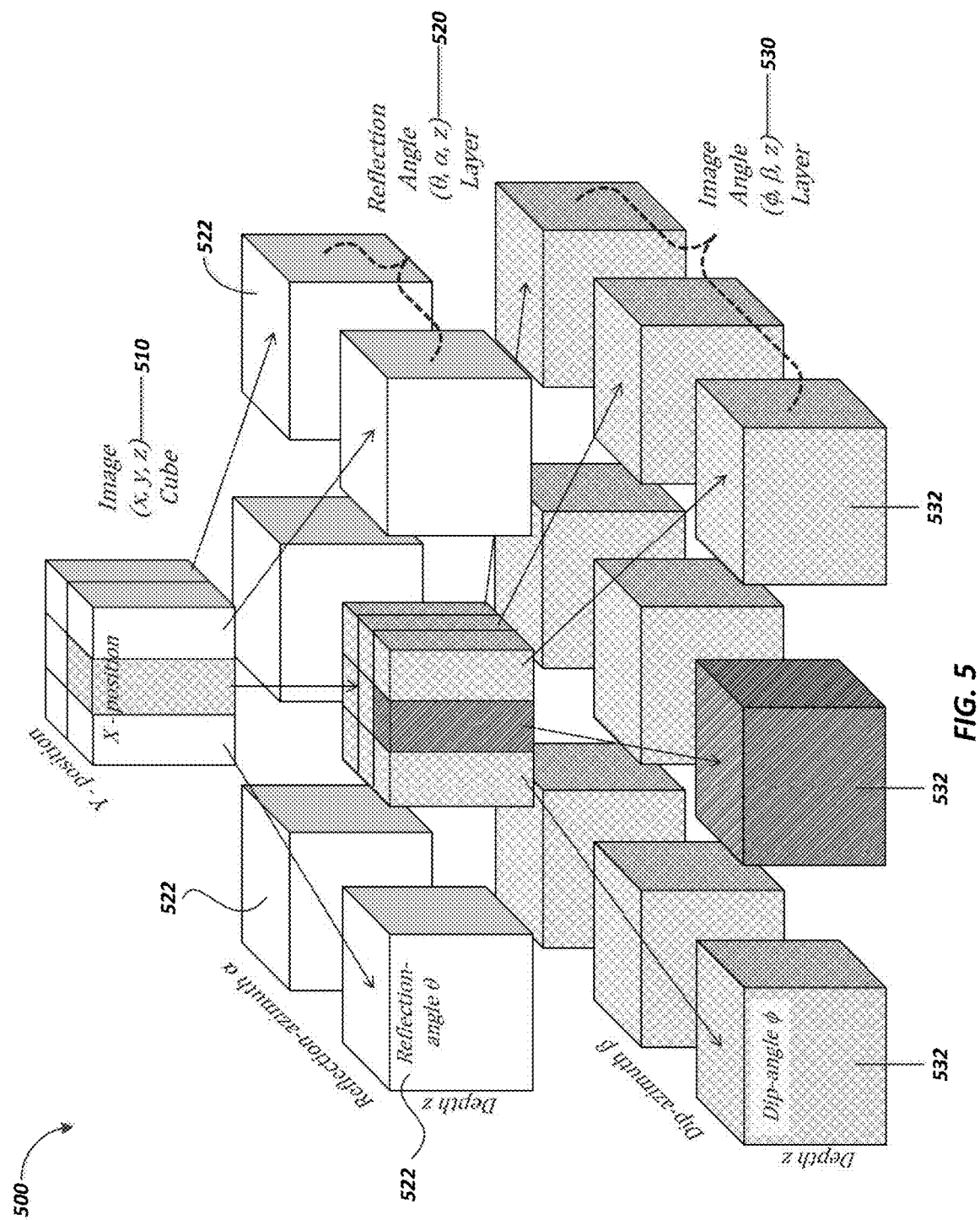
FIG. 5 is a diagram showing example data hierarchy of angle-domain common-image gathers (ADCIG) cubes.

FIG. 5 is a diagram showing example data hierarchy 500 of ADCIG cubes. The data hierarchy 500 of ADCIG starts with a top layer 510 of the output image (x, y, z) cube. For each (x, y) position, there is a corresponding (θ, α, z) volume 522 in the middle layer 520 to represent reflection angle θ and reflection-azimuth angle α for every depth sample. Then for each (θ, α) angle pair (or an index-pointer) of each volume 522, there is a corresponding (φ, β, z) volume 532 in the lower layer 530 to represent dip angle φ and dip-azimuth angle β for every depth sample. The five-dimensional data cube (θ, α, φ, β, z) can be arranged in another manner depending on post-processing applications or other criteria. The five-dimensional data cube (θ, α, φ, β, z) can be processed after migration for various applications.

Figure 6:
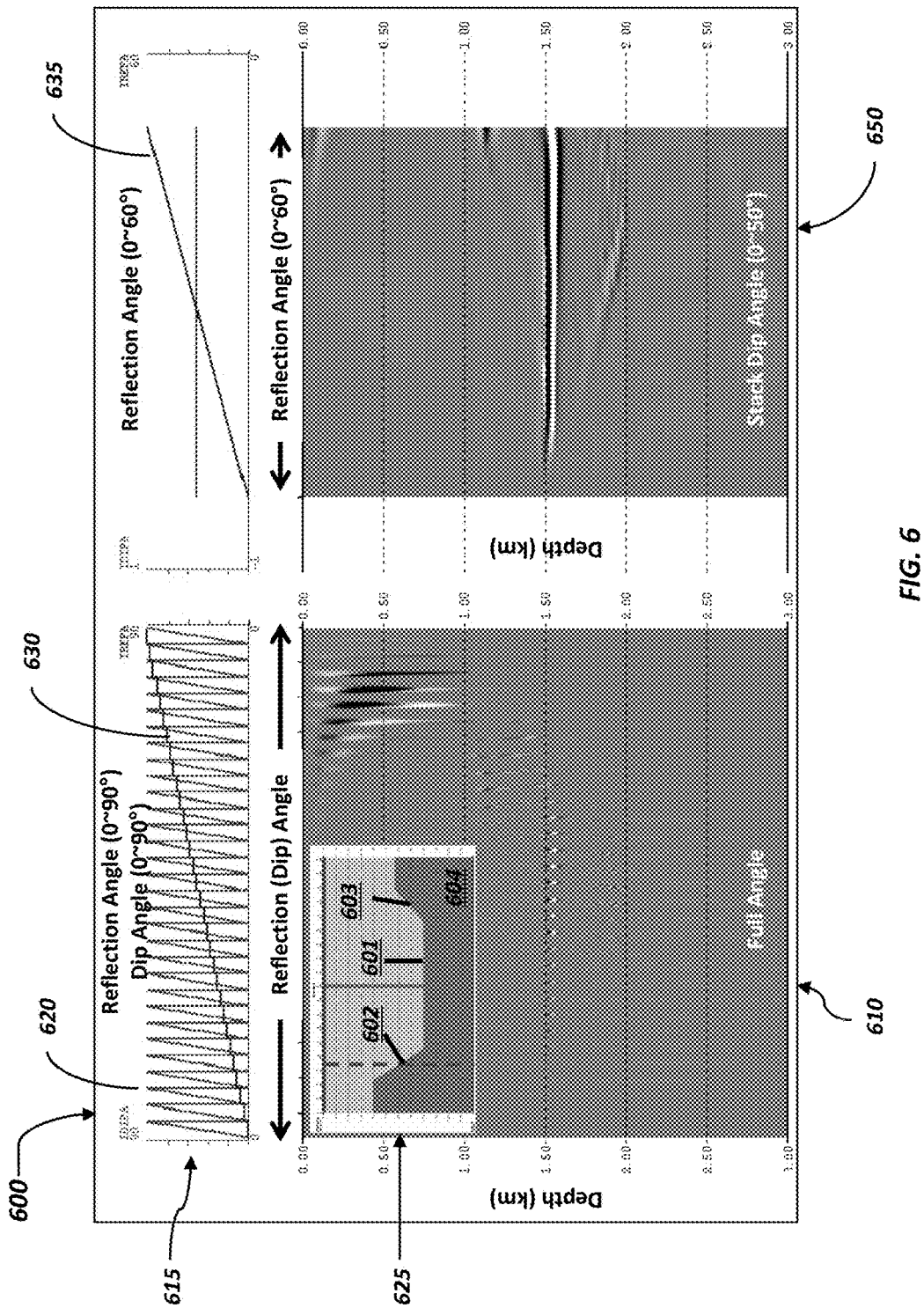
FIG. 6 includes plots showing example full ADCIG and processed ADCIG based on 3D VSP data of a synthetic model, respectively.

FIG. 6 includes plots 610 and 650 showing example full ADCIG and processed ADCIG, respectively, based on a synthetic VSP data of a velocity model 625. The example synthetic model 625 includes a single reflector 601 with two reversed dips 602 and 603 overlaid a high velocity lower layer 604. Plot 610 shows the full ADCIG images obtained by Kirchhoff integral method for synthetic VSP data with dip-angles and the reflection angles ranging from 0° to 90°, respectively. The subplot 615 above the full ADCIG image 610 shows a chain-saw curve 620 representing the dip angles and a stair-stepping line 630 representing the reflection angles for corresponding traces of the ADCIG. In the illustrated example, the dip angles vary more rapidly than the reflection angles. Plot 650 shows the processed ADCIG image that is obtained by stacking (e.g., summing) dip-angles ranging between 0° and 90° (e.g., 0°~50°) for reflection angles ranging between 0° and 60°. To reduce edge effects, dip-angle traces are weighted with a windowing function before stacking (also referred to as a diversity stack method). The subplot 615 above the partially stacked ADCIG image 650 shows a line 635 representing the reflection angles that ranges from 0° to 60°. The partially-stacked reflection-angle gathers can be used, for example, to estimate subsurface information.

Figure 7:
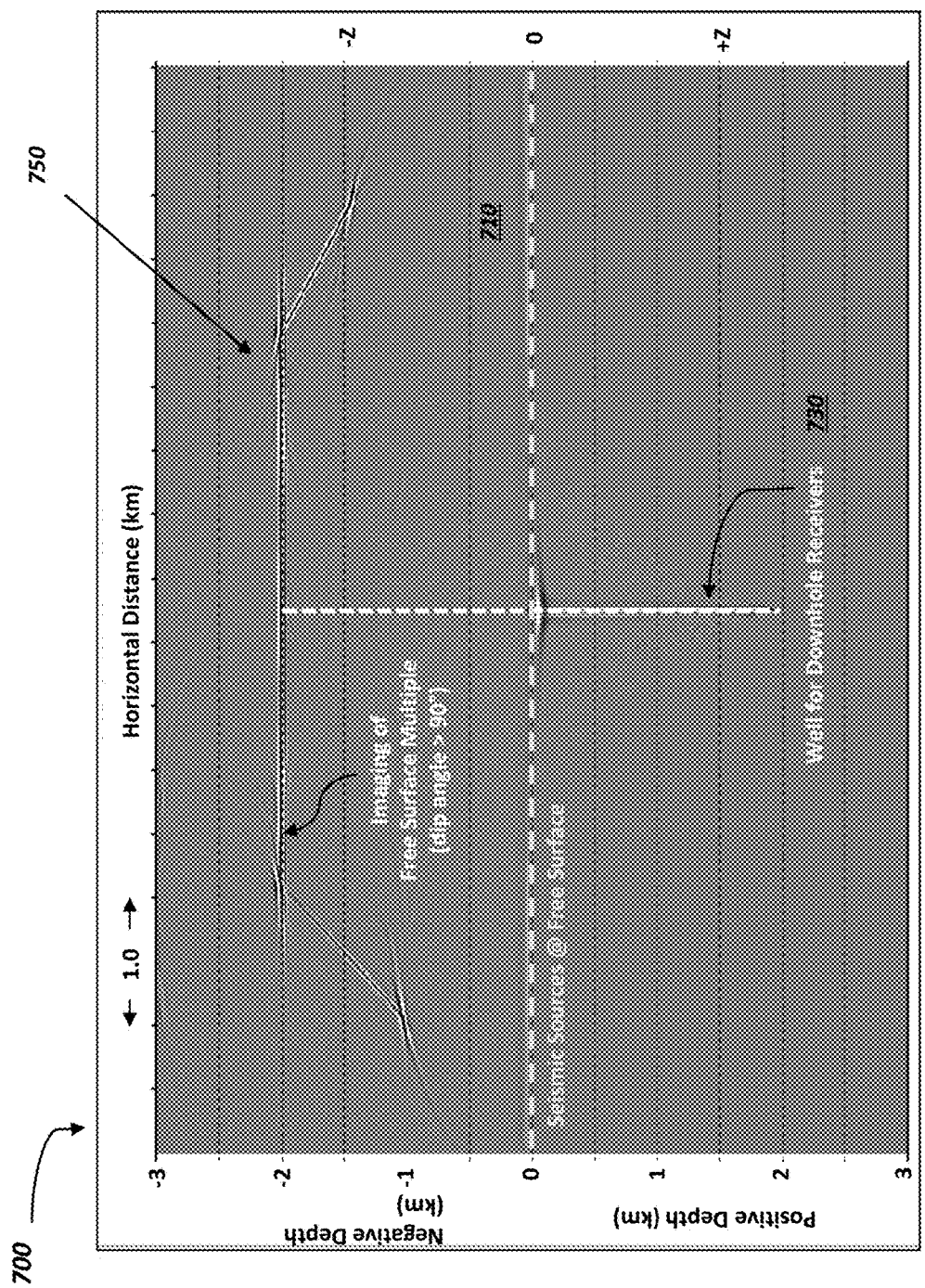
FIG. 7 is a plot showing an example of stacking high dip-angles to produce structure images associated with down-going waves.
Figure 8:
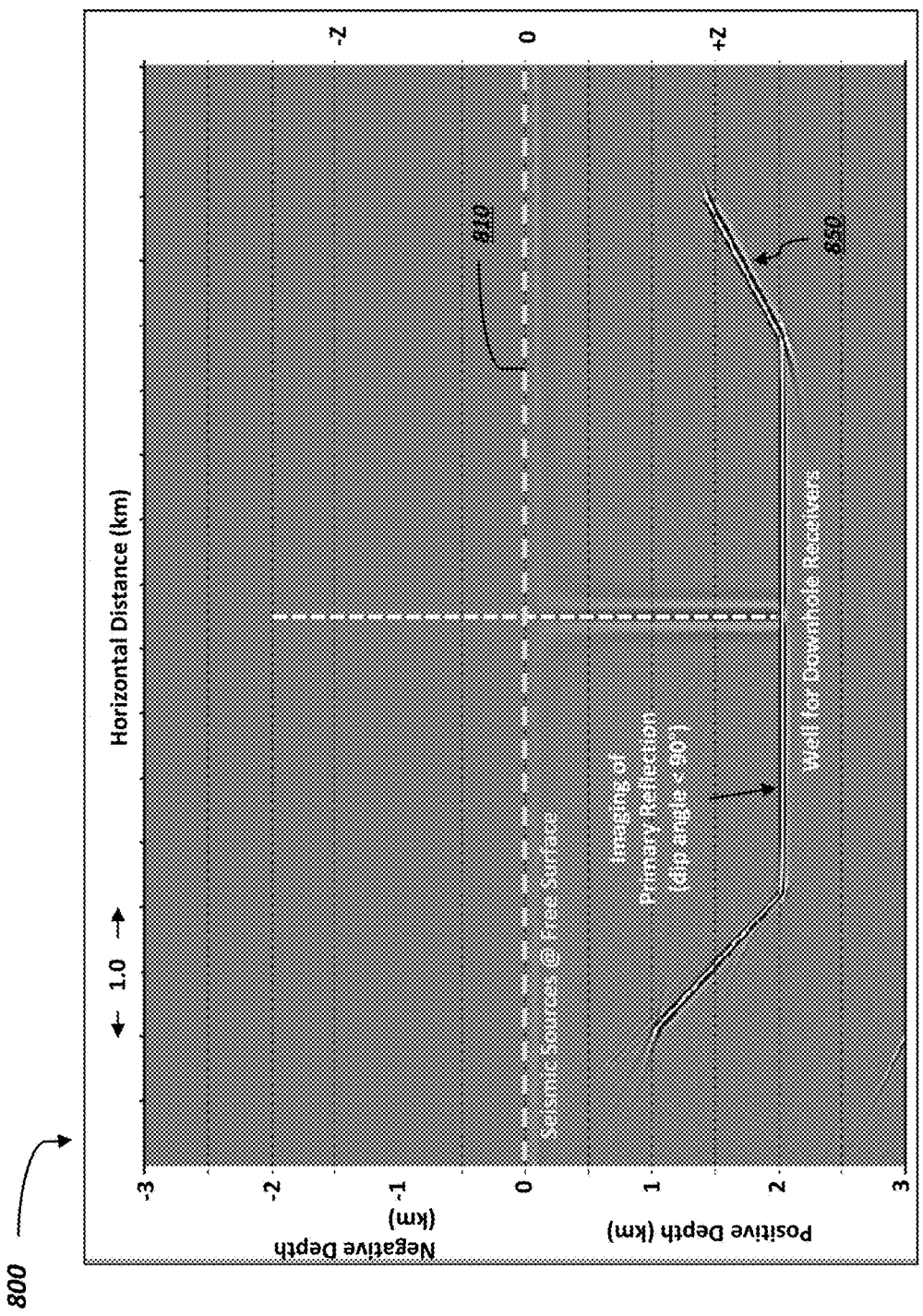
FIG. 8 is a plot showing an example of stacking low dip-angles to produce structure images associated with up-going waves.

Another example application of post-processing of ADCIG is to select desired dip-angle ranges to produce images associated with down-going energies and up-going energies. FIG. 7 is a plot 700 showing an example of stacking high dip-angles to produce structure images 750 associated with down-going waves. FIG. 8 is a plot 800 showing an example of stacking low dip-angles to produce structure images 850 associated with up-going waves. The dip-angles for the down-going images 750 shown in FIG. 7 have values ranging between (min, max)=(120°,180°). The dip-angles for the up-going images 850 shown in FIG. 8 have values ranging between (0° ~120°). The reflection angles for the up-going images 850 shown in FIG. 8 have values between (0° ~60°).

In some instances, the "mirror" images 750 produced above the free surface 710 are mainly contributed from the free surface multiples that can widen the Fresnel zone of the shallower reflections, and can be constructively stacked with a polarity reversal of the up-going images 850 as shown in FIG. 8 to enhance the total image beneath free surface 710. Thus, the conventional up-down separation of VSP data during a pre-processing effort is no longer required.

In some implementations, to implement the Kirchhoff integral method for migration, the multi-parameter Green's function can be pre-computed and stored in tables for use in migration. In some instances, the multi-parameter tables of the Green's function can be produced or computed based on a dynamic ray-tracing algorithm. For each source or receiver position, the dynamic ray-tracing algorithm can calculate both travel time and amplitude information along multiple ray-paths being traced from that initial position throughout a 3D velocity model. The dynamic information at each image point of the 3D space can be obtained by interpolation among multiple ray-paths and stored in a multi-dimensional data tables. The interval or instantaneous velocity model can be an isotropy or anisotropy model or another kind of velocity model in the depth domain. In some implementations, since VSP geometry may require placing a buried source in various depth positions, ray-tracing may need to be computed with full 360° azimuth and 180° dip angles directions for both up and down-going components simultaneously without any termination criteria.

In some implementations, the multi-parameter tables of the Green's function can include three main attributes: (1) travel time, (2) amplitude, and (3) total turns of 90° phase-rotation for each subsurface location. The Green's function G(x, y, z, Time+Amplitude+Phase) can be selected based on a maximum-amplitude criterion. For example, there can be multiple ray paths that arrive at a same image point location (x, y, z) with attributes as (1) travel times, (2) relative amplitudes (e.g., in percentage of initial source strength) and (3) its phase rotations of all arrivals. The maximum-amplitude criterion can only select the attribute associated with the maximum amplitude (or energy) at the subsurface location for subsequent computation.

In some implementations, for the ease of imaging multi-component VSP data as PP, SS, and PS-data, the multi-parameter tables of the Green's function can be stored in different files to differentiate which velocity model type is used for ray-tracing. For example, PS means that the incident seismic wave from the source to the image point is P-wave (compressional wave), and it reflects as an S-wave (shear wave). Different velocity models can be used for the P-wave and S-wave. Accordingly, to image the PS-data, the multi-parameter tables for the source S can be stored in File-1 for the P-wave velocity model, while the multi-parameter tables for the receiver R can be stored in File-2 for the S-wave velocity model. On the other hand, PP means that the incident seismic wave is a P-wave, and it reflects as a P-wave; SS means that the incident seismic wave is an S-wave, and it reflects as an S-wave. To image PP-data or SS-data, same table file can be used between the source S and the receiver R.

In some implementations, mode-converted energy PS-data can be migrated in a time domain for VSP geometry to avoid depth-to-time conversion in the post-processing. For example, the multi-attribute tables of the Green's function can be converted from depth to vertical two-way time (TAU) axis to allow ADCIG data to be imaged in the time domain directly. This conversion can be important to bypass the post-processing of PS-ADCIG, since it is very difficult to stretch depth to time by scaling only S-wave velocity model alone. Equation (7) shows the relation between tau (τ) and depth (z), where TAU at every depth sample can be obtained by accumulating contributions from finer depth increment dζ through a vertical velocity function $V_v(\zeta)$:

$$\tau(z) = \int_0^z \frac{2}{V_v(\zeta)} d\zeta. \quad (7)$$

In some instances, since angle attributes are directly computed from gradients of the travel time field, any void travel time areas (the shadow zones) may fail to contribute input data to the output ADCIG and yielding low quality images. To infill travel time shadow zones, several example methods can be used. For example, (1) applying a two-point ray-tracing algorithm between all samples in the shadow zones and the corresponding source or receiver position, (2) applying the Eikonal equation to compute the full travel time table again, and substituting null values with the Eikonal solution or (3) applying dynamic ray-tracing from every sample of the shadow zones until the shadow zones are fully in-filled. The (1) two-point ray-tracing algorithm and (3) dynamic ray-tracing algorithm are example ray-equation methods for infilling null Green's function tables. In some implementations, additional or different techniques can be used to handle the shadow zones.

Figure 9:
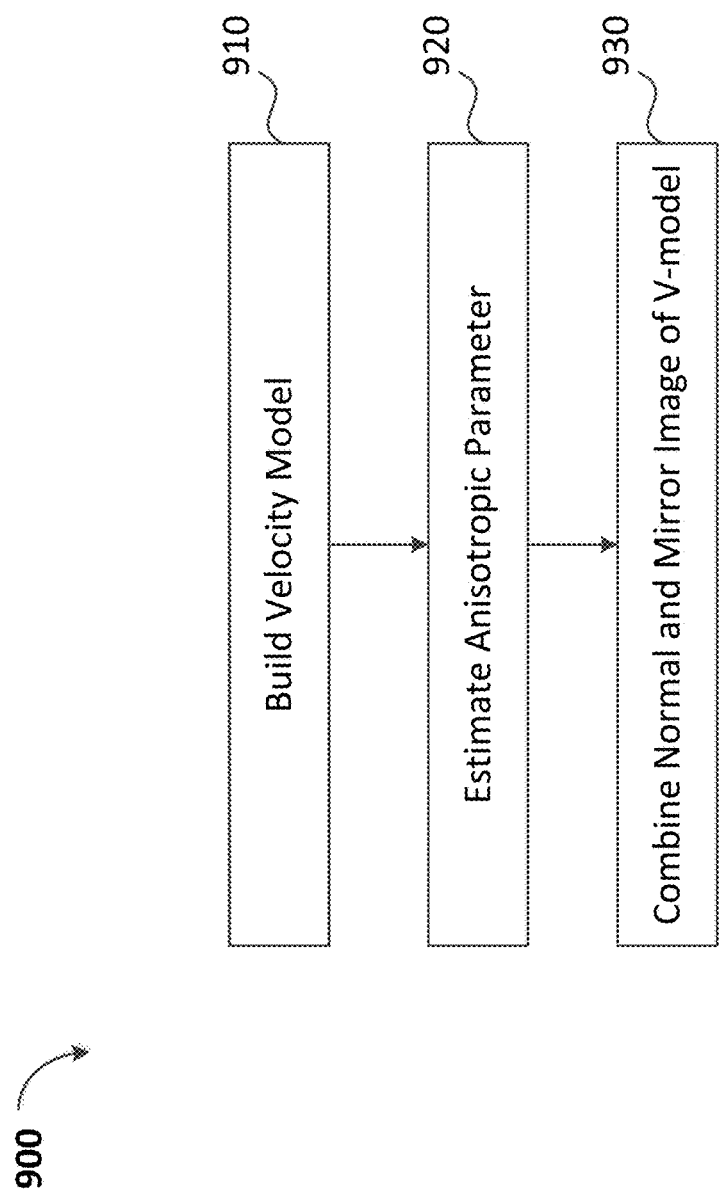
FIG. 9 is a flow chart showing example method for merging normal velocity model and its mirror-image component into a single volume.

In some implementations, for composite imaging of down- and up-going reflections, the normal velocity model (e.g., for the up-going reflections) and its mirror-image components (e.g., for the down-going reflections) can be merged into a single volume as v(x,y,−z+z). For instance, FIG. 9 is a flow chart showing example process 900 for merging normal velocity model and its mirror-image component into a single volume. The process 900 can be implemented, for example, as computer instructions stored on computer-readable media and executable by data processing apparatus (for example, one or more processor(s) of the computer system 150 in FIG. 1). At 910, a normal velocity model can be built or received at first. For example, the data processing apparatus can design, select, or otherwise build a velocity model by using the Dix equation to convert normal-moveout (NMO) velocity estimated from input data to an interval velocity model or by using the interval velocities measured from well log devices. At 920, anisotropic parameters of the velocity model can be estimated. For example, the anisotropic parameters can include, for example, Thomsen's epsilon and delta parameters for P-wave VTI media. The data processing apparatus can estimate the anisotropic parameters, for example, based on non-hyperbolic NMO of input data or by focusing analysis in the image domain. At 930, the normal velocity model and its mirror-image components can be combined, for example, by duplicating the sample value at the regular depth level (Z) for the opposite depth level (−Z) of the composite axis.

Table 1 illustrates an example algorithm for computing multi-parameter Green's function table, for example, to image multi-component (P, S, PS) data.

TABLE 1

Example algorithm for computing multi-parameter Green's function table

LOAD velocity model files (isotropy or anisotropy model)
BLEND normal velocity model with its mirror-image V(x, y, −z+z) (option)
LOOP over source and receiver (S,R) positions
  COMPUTE dynamic ray-tracing with full azimuth and dip angles
  SELECT multi-parameters G(T, Amp, Phz) related to maximum energy
  IF shadow zone exist
    OPTION-1: two-point ray tracing between null zones and (S, R) position
    OPTION-2: Eikonal solution from (S, R) position
    OPTION-3: dynamic ray tracing between null zones and (S, R) position
  REPLACE shadow zones with active values
  STRETCH table from depth to tau (option)
PRODUCE multi-attribute tables in two files for S and R, respectively In some implementations, the multi-parameter Green's function tables may be built with coarser sampling interval (Δx, Δy, Δz) for their complete storages in the computer memory that can then be retrieved more efficiently than to read from much slower devices such as hard disks. The coarser Green's function tables can be spatially re-interpolated for the finer image grid during the migration stage. Two example interpolation methods can be used: (1) tri-cubic spline and (2) tri-linear interpolation. Tri-cubic spline interpolation requires a total of 64 input data samples to produce one output sample, while a tri-linear scheme requires only 8 samples. To improve coherency of tri-linear interpolation, a median filter can be applied in a moving window fashion to reduce spatial variance of output angle-attribute values. In some implementations, additional or different interpolation methods can be used for spatial interpolation of Green's function.

In some implementations, parallel programming can be implemented to perform the Kirchhoff integral method since it is a compute-intensive algorithm. For example, total computing tasks can be distributed among multiple compute nodes (e.g., a cluster of computer nodes) for real data application.

TABLE 2

Example algorithm for generating ADCIG with Kirchhoff integral method (a single-computing-node version)

OPEN multi-parameters table files produced by ray-tracing
LOOP over every input data trace D(S, R, T)
  PRE-PROCESS trace (scaling, differentiation, filtering, etc.)
  LOAD multi-parameters tables G(x, y, z/τ, T+Amp+Phz) for (S, R) pair
  COMPUTE full angle attributes (4D angle attributes)
  APPLY median filter to angle attributes (option)
  LOOP over every image sample I(x, y, z/τ) within aperture with the 4D angle attributes
    RESAMPLE multi parameters table
    COMPENSATE amplitude loss (option)
    APPLY anti-alias filter
    STACK input data amplitudes in ADCIG
    STACK hit-counts in ADCIG
  STACK ADCIG containing hit-counts
PRODUCE ADCIG containing hit-counts in disk file Table 2 shows an example Kirchhoff integral algorithm for generating ADCIG using a single computing node. A single computing node can be a single processor of a computing system that includes one or more processors (e.g., the computer system 150 in FIG. 1). Since the file size of complete multi-parameter Green's function tables can far exceed the maximum memory size of a single computing node, spatial decomposition of these tables among multiple computing nodes may be necessary. For instance, the computing node can store one or more multi-parameters Green's function tables produced by ray-tracing, and thus produce partial ADCIG images according to the example techniques described with respect to Table 1. The final ADCIG images are obtained by summing all partial images produced by all computing nodes. For each input data trace D(S, R, T) with a source location S, receiver location R and the travel time T, the computing node can pre-process the input data trace, for example, by scaling, differentiation, filtering or otherwise processing the input data trace. Then the computing node can load multi-parameters tables G(x, y, z/τ, T+Amp+Phz) for a particular (S, R) pair, and compute the full angle attributes (e.g., a reflection angle, reflection-azimuth angle, dip angle and dip-azimuth angle), for example, according to Equations (2)-(6).

In some implementations, for every image sample I(x, y, z/τ) within the migration aperture with the 4D angle attributes, the computing node can resample the multi-parameters table G(x, y, z/τ, T+Amp+Phz). In some instances, these multi-parameters tables can be pre-computed independently with different spatial sampling (dx, dy, dz) intervals than those of ADCIG. Resampling can be applied to reconstruct the multi-parameter tables to produce the ADCIG data. For example, the pre-computed multi-parameter table can have grid spacing (dx, dy, dz)=(100m, 100m, 20m); and the resampled tables can have (dx, dy, dz)=(50m,50m,5m) that is matched to the sampling of the ADCIG.

In some implementations, amplitude loss of the input data traces can be compensated. For example, for relatively-true amplitude migration, the computing node can use one or more amplitude and phase-rotation parameters of the Green's function table to compensate amplitude loss at each (x,y,z) location during migration. In addition, a hit-count attribute that registers the irregular illumination of the VSP geometry can be used to normalize amplitudes of ADCIG samples selected for stacking in post-processing. In some instances, normalization without angle control tends to boost amplitudes related to migration artifacts and operator aliasing. Use a median filter to stabilize the hit-count attributes before stacking is another option (e.g., as shown in Table 3).

In some implementations, anti-alias filtering can be applied, for example, for high resolution imaging. As an example, the computing node can use the derived dip-angle attribute to reduce frequency bandwidth of migration operator at steeper dips by lowering the frequency contain of the input data for summation. Thus anti-alias filters can work as a dip filter, e.g., high dip angles reduce frequency content of data and lower dip angles retain full frequency bandwidth of input data for Kirchhoff summation. In this way, dipping reflections can be imaged constructively.

After looping over every image sample I(x, y, z or τ) within the migration aperture for the above operations, the computing node can stack all input data amplitudes in the ADCIG domain, for example, based on the Kichhoff summation as shown in Equation (1). Thus, unlike existing methods that produce seismic images either with single attributes (such as offset) or no attributes (such as stacked section), the ADCIG generated by the example algorithm in Table 2 can contains group of imaged seismic traces at each (x, y, z) location showing reflection amplitudes as function of (1) opening angle, (2) opening-azimuth angle, (3) dip angle and (4) dip-azimuth angle.

In some implementations, hit-counts of each image point can be stacked in the ADCIG domain and the ADCIG containing hit-counts can be stacked. The hit-counts that reflect the total illumination fold of each image point can be preserved in output data. For example, the first half of the output trace can contain the amplitudes while the second half can contain the hit-counts. The ADCIG containing hit-counts can be saved or otherwise output in a disk file or another file. The ADCIG containing hit-counts can be used, for example, to compensate the irregular illumination geometry of VSP data.

In some implementations, the generated ADCIG can be post-processed to enhance the structure image, separate images for up- and down-going waves for enhancing shallow reflections, image mode-converted data with improved resolution, or any other applications. In some implementations, the post-processing can be interpretation-based. For example, since VSP data are often acquired in the later stage of exploration for high resolution imaging of potential reservoirs, plenty of information obtained from surface seismic and well-logs are available and can be used to enhance the ADCIG. Helpful information can include, for example, (1) horizon picks from surface seismic data and (2) reflection angles estimated from well-logs and ray-based modeling methods.

Horizon-picks generated from structure interpretation can include multiple layer boundaries extracted from surface seismic data. To use the horizon-picks for post-processing ADCIG, these manually picked horizons Z(x, y) can be resampled to fill the image grid as continuous surfaces. For example, the horizon-picks can be vertically resampled along azimuth and dip axes by recalculating azimuthal and dip angle vectors at the interpreted grid nodes to generate 3D volumes as $\vec{\varnothing}(x, y, z)$ and $\vec{\alpha}(x, y, z)$. The generated ADCIG can be partially stacked along selected dip-traces within a (min, max) threshold that is defined by the interpreted dip (i.e., diversity stacking, weighted with a windowing function before stacking) The resultant multi-azimuth data can be partially stacked to produce common-azimuth-tiles, for example, for displaying fractures and faults. In some other implementations, to generate reflection-angle gathers, the traces can be further cumulated along all dip-azimuth tiles.

The reflection-angle map (RAM) generated by well-logs and ray-based modeling can include reflection-angles computed for every geology interface. These reflection angles can be resampled vertically for the output image grid as θ(x, y, z) and used as a guide to define its (min, max) range, for example, for reflection-enhancement and muting of post-critical reflections. The processed reflection-angle gathers are useful, for example, for updating anisotropy velocity model by applying residual moveout analysis along azimuthal direction and updating the isotropy velocity model without the azimuthal contributions.

In some implementations, the post-processing of the ADCIG can include applying a phase-alignment filter to flatten reflection events in the opening-angle domain. This assumes the velocity model for producing the ADCIG is correct and wherever residual NMO of events occurs and is caused by irregular illuminating geometry. The phase-alignment filter can flatten reflection events along the opening-angle axis and suppress artifacts caused by irregular survey geometry.

Table 3 shows an example interpretation-based post-processing algorithm to enhance subsurface images. The example post-processing algorithm includes processing of both horizon-picks and reflection-angle-map (RAM) information. In some implementations, a post-processing algorithm can include fewer, more, or different operations. For instance, when external guide data are not available (e.g., lacking surface seismic interpretation and well-log data), some example techniques can be applied, which can include (1) estimating a 1-D velocity model from either zero- or near-offset VSP data, (2) migrating data with the 1-D velocity model for both up- and down-going energies, (3) picking horizons and residual moveouts to update velocity in the angle domain, (4) rerunning migration and velocity updates in an iterative fashion, (5) generating ADCIG for final velocity model, and (6) post-processing to enhance ADCIG.

TABLE 3

Example interpretation-based post-processing algorithm for ADCIG

LOAD ADCIG containing hit counts
LOAD velocity model V(x, y, z)
LOAD horizon-picks T(x, y) obtained from interpretation
LOAD reflection-angle-map (RAM): θ(x, y, z) from modeling (option)
LOOP over (x, y) position of ADCIG
   STRETCH depth to time (option)
   RESAMPLE horizon-picks along azimuth and dip axes
   LOOP over reflection-angles θ(α, φ, β, t) with the RAM guide
     LOOP over reflection-azimuth angles α(φ, β, t)
       LOOP over dip-angles φ(β, t) guide by interpreted-horizons
         APPLY mute function computed from velocity or RAM model
         LOOP over dip-azimuth angles β(t)
           APPLY hit-count normalization with median filter (option)
           DIVERSITY stack dip-azimuth angle traces (option)
         DIVERSITY stack dip-angle traces (option)
      PICK residual moveout to produce Δt(θ(α))
      DIVERSITY stack azimuth angle traces (option)
   ALIGNMENT of reflection events
   DIVERSITY stack reflection-angle traces (option)
PRODUCE ADCIG I(x, y, t, θ)
PRODUCE structure images I(x, y, t)/I(x, y, t, α)/I(x, y, t, θ)/I(x, y, t, φ)
PRODUCE residual moveout file Δt(x, y, θ(α))

Figure 10:
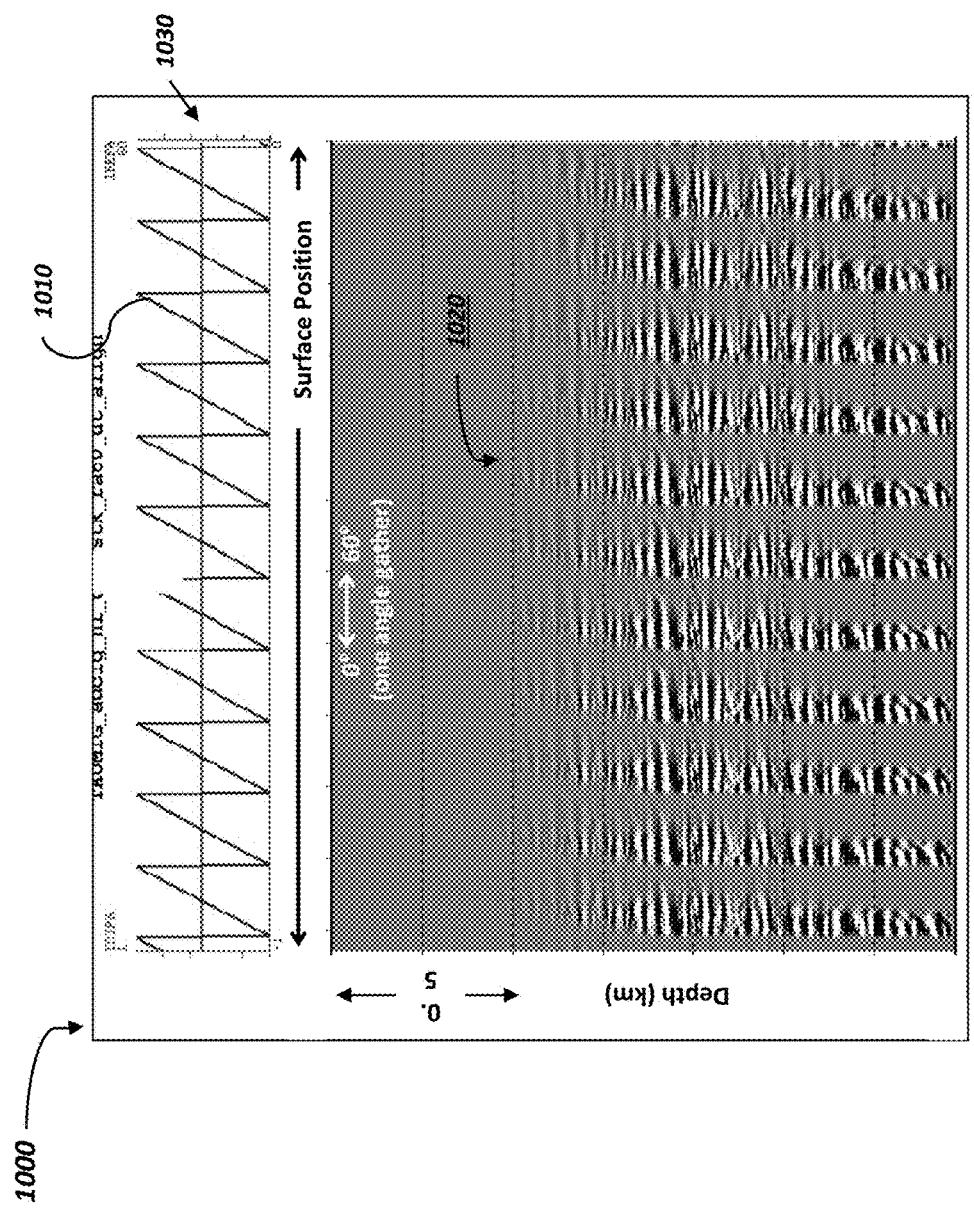
FIG. 10 is a plot showing example processed reflection-angle gathers after applying the phase-alignment filter.

FIGS. 10-13 show example applications of the post-processing techniques to enhance structure images. FIG. 10 is a plot 1000 showing example processed reflection-angle gathers after applying the phase-alignment filter. In this example, the generated ADCIG data are firstly stacked along three axes (dip, reflection-azimuth and dip-azimuth). The output ADCIG 1020 contains reflection-angle gathers at 11 surface locations with fixed distance interval along one inline. Traces of each reflection-angle gather are produced between opening angles 0° ~60°. The subplot 1030 above the angle gathers 1020 shows a chain-saw curve 1010 representing the opening angles between 0° ~60°.

Figure 11:
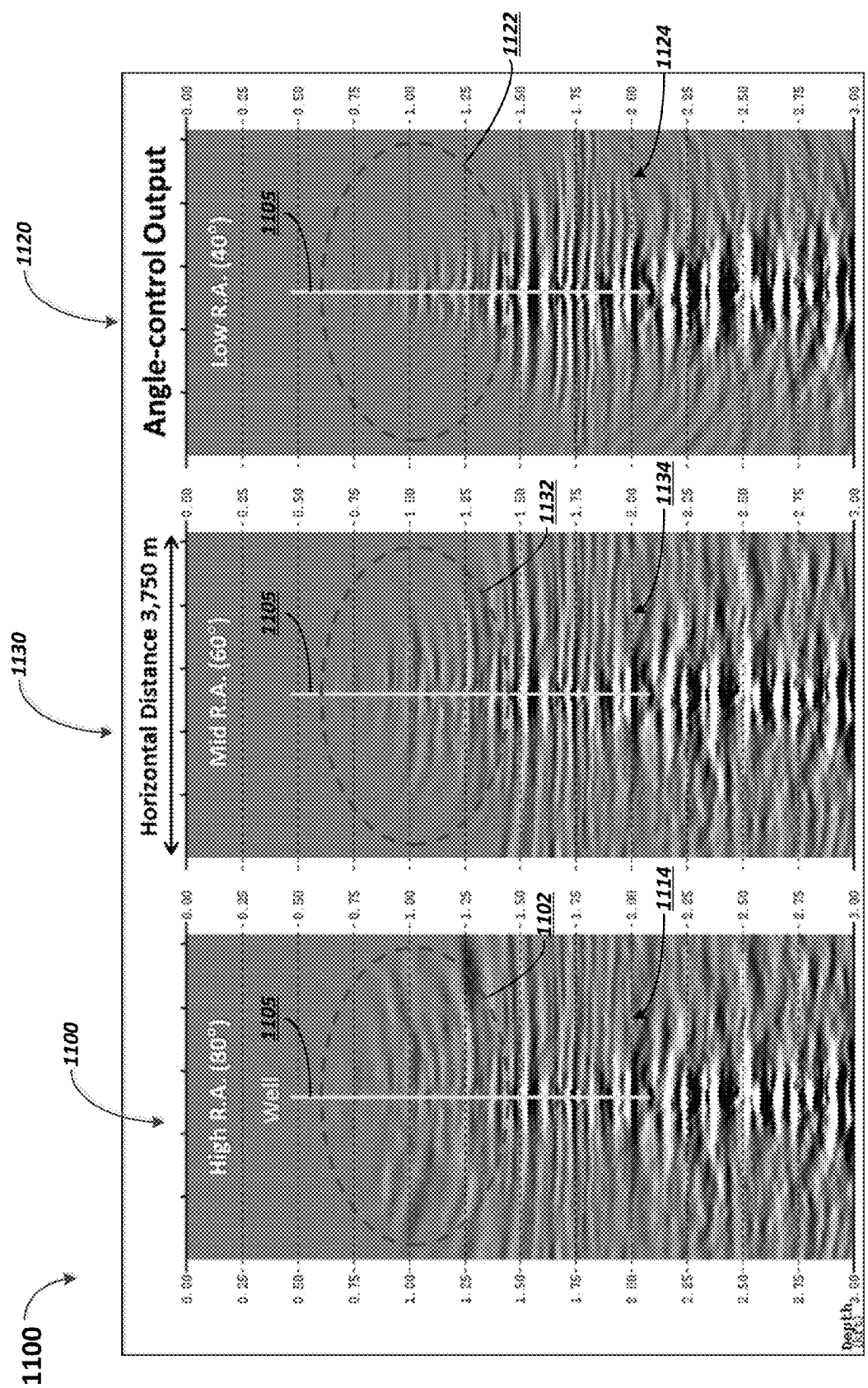
FIG. 11 includes three plots showing an example result of suppressing migration artifacts.

FIG. 11 includes three plots 1100, 1120, and 1130 showing an example result of suppressing migration artifacts with stacking of less reflection angles. In this example, the 4D ADCIG are first stacked along three directions: dip angle, reflection-azimuth angle and dip-azimuth angle to produce the reflection angle gathers. Additional stacking along the reflection angle axis for values ranging in (0° ~80°), (0°~60°) and (0°~40°) are as shown as images 1114, 1124, 1134 in plots 1100, 1120, and 1130, respectively. As illustrated, wider reflection angles can generate noticeable lower spatial resolution at shallow depth above 1.5 km (e.g., as shown in the circled area 1102 of plot 1110); while, lower reflection angles produced significant "swing" artifacts with less lateral extension (e.g., as shown in the circled area 1122 of plot 1120). Such artifacts can be suppressed with a horizon-based post-processing process (e.g., the example algorithm described with respect to Table 1) that focuses only on selected dip and reflection angle ranges to produce the final stack. The central plot 1130 shows the final stacked image (e.g., in the circled area 1132) with suppressed migration artifacts by diversity stacking reflection angle ranging 0°~60°.

Figure 12:
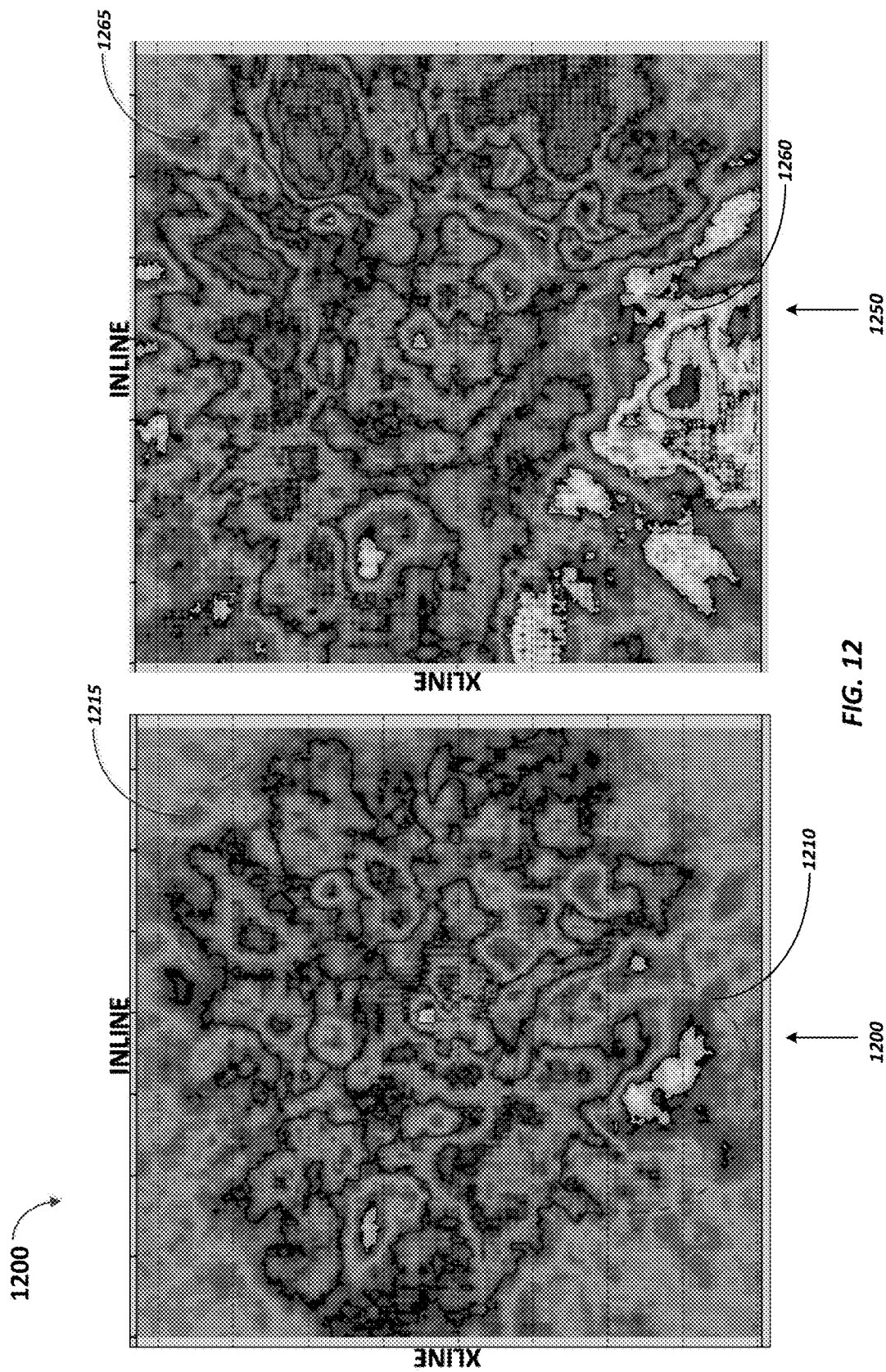
FIG. 12 includes plots showing t showing map views of key amplitudes of constant time slices along two angular ranges.

FIG. 12 includes plots 1200 and 1250 showing map views of key amplitudes of constant time slices along two angular ranges. The plot 1200 shows the stack of ADCIG at constant time slice after the alignment of reflection events between opening angles of 30° and 40°, while the plot 1250 shows the stack of ADCIG at constant time slice after the alignment of reflection events between opening angles of 35° and 45°. Amplitude variations versus reflection angles can be observed from the circled areas 1210, 1215 and 1260, 1265 of the two plots, respectively: the amplitudes are stronger in higher reflection angles in these areas.

Figure 13:
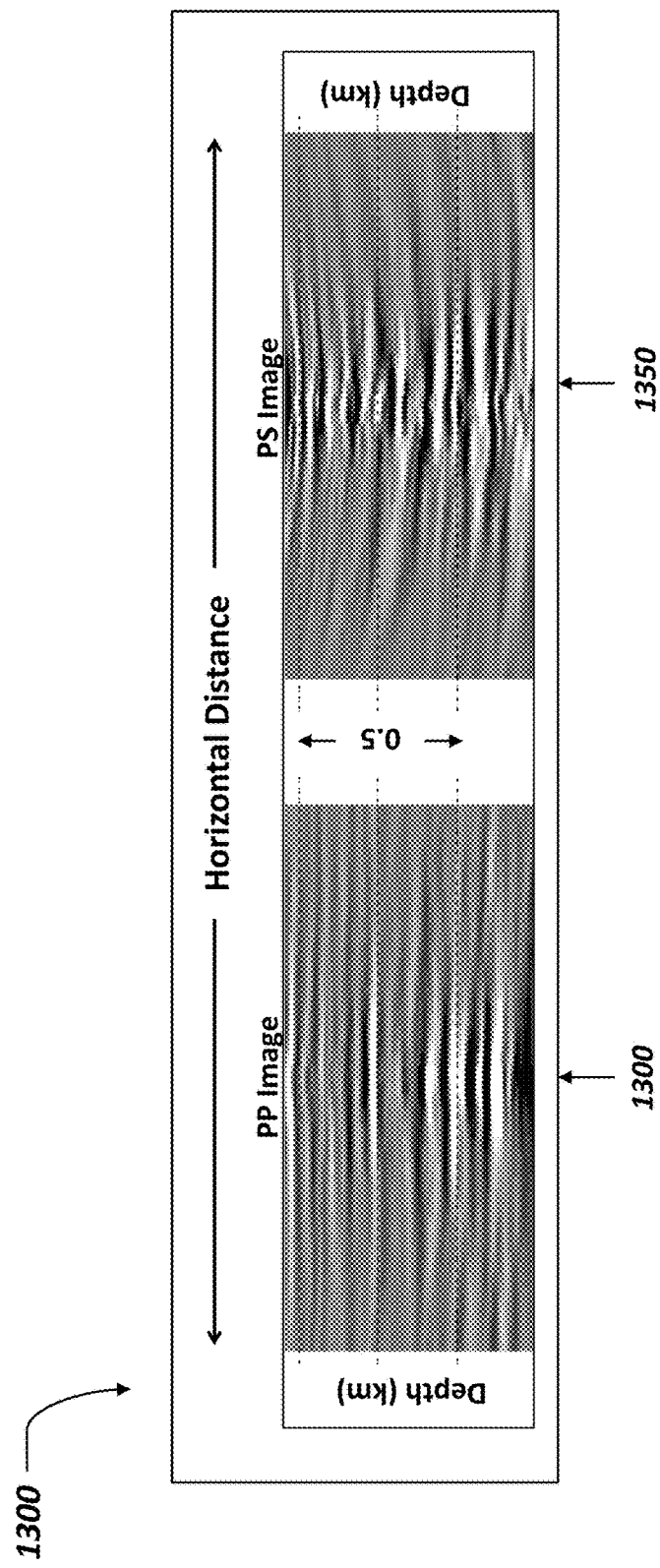
FIG. 13 includes plots showing examples of Kirchhoff imaging of PS-data.

FIG. 13 includes plots 1300 and 1350 showing examples of Kirchhoff imaging of PS-data using a sub-optimal shear wave velocity model. The plot 1300 shows the PP images and the plot 1350 shows the PS image. Note the resolution of PS image is higher than the PP image. In some implementations, another pass of updating S-wave velocity model can be used to flatten the PS-images.

Figure 14:
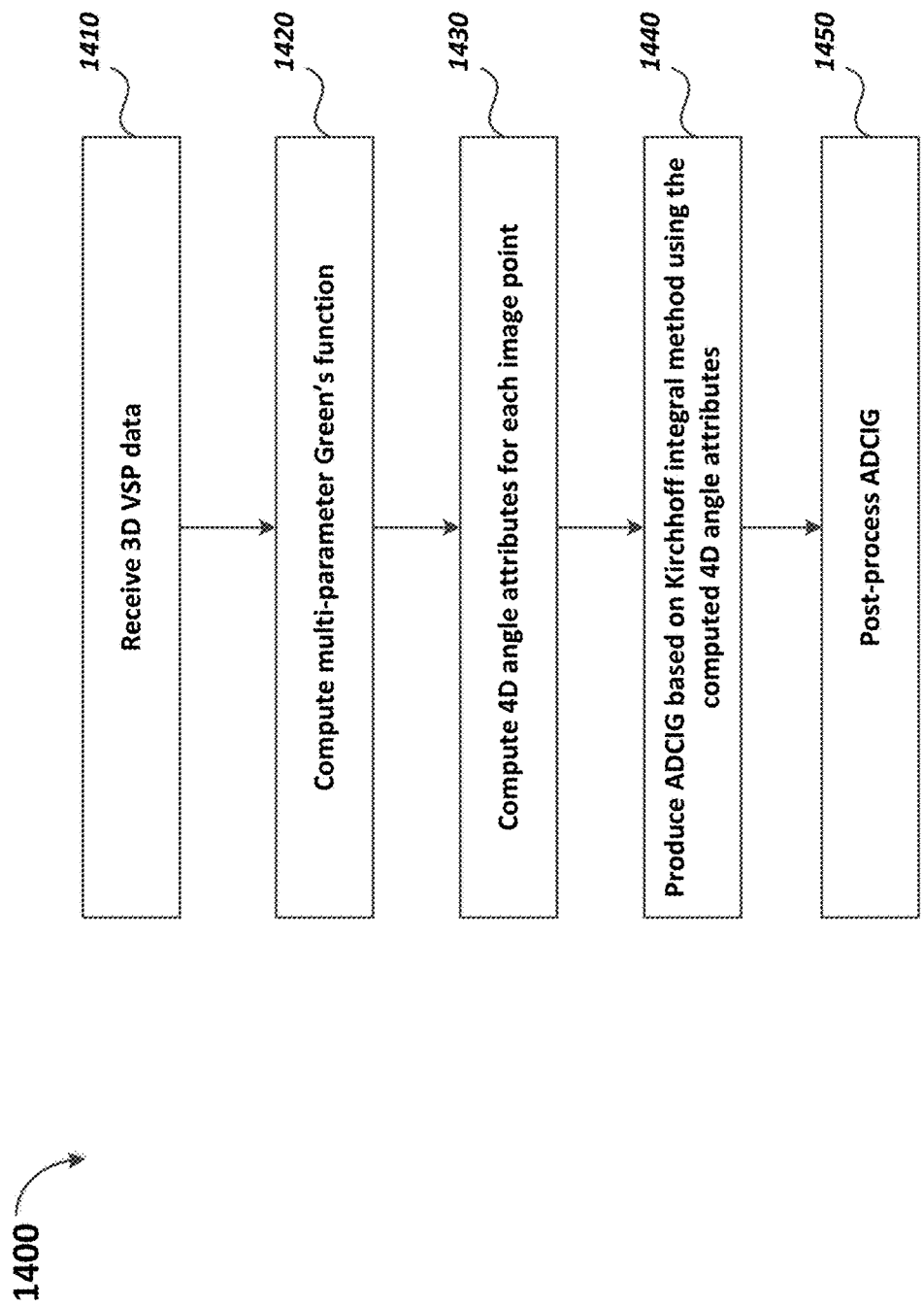
FIG. 14 is a flow chart showing example process for processing 3D VSP data for reservoir analysis.

FIG. 14 is a block flow chart showing example process 1400 for processing 3D VSP data for reservoir analysis. The process 1400 can be implemented, for example, as computer instructions stored on computer-readable media and executable by data processing apparatus (for example, one or more processor(s) of the computer system 150 in FIG. 1). In some implementations, some or all of the operations of process 1400 can be distributed to be executed by a cluster of computing nodes, in sequence or in parallel, to improve efficiency.

At 1410, VSP data of a subterranean region can be received. The VSP data can be 3D VSP data collected, for example, by downhole receivers (e.g., the downhole receivers 120 in FIG. 1) during a 3D VSP survey conducted by a well survey system (e.g., the well survey system 100 in FIG. 1). The 3D VSP data can be received by the data processing apparatus (e.g., one or more processor(s) of the computer system 150 in FIG. 1). In some implementations, the 3D VSP data can be stored in a computer-readable media (e.g., memory) and the processing apparatus can load the 3D VSP data from the computer-readable media. The 3D VSP data can include, for example, input data traces D(S, R, T) with a source location S, receiver location R and the travel time T for multiple image points. The 3D VSP data can include other information acquired by multi-component sensors such as vector geophone and scalar hydrophone to reveal elastic properties of subsurface reflectors via directionality of wave motion and variation of pressure fields.

At 1420, multi-parameter Green's function can be computed. For example, the data processing apparatus can compute multi-parameter tables of Green's function based on the example techniques described with respect to Table 2, or in another manner.

At 1430, four angle attributes for each image point can be computed based on the received VSP data. The four angle attributes can include, for example, a reflection angle, reflection-azimuth angle, dip angle, and dip-azimuth angle. The data processing apparatus can compute the four angle attributes according to the example techniques described with respect to FIGS. 1-5, especially the Equations (2)-(6). In some implementations, the data processing apparatus can compute the four angle attributes in another manner. In some implementations, each of the four angle attributes can be computed for a full 0°~360° range, or another specified range as needed.

At 1440, ADCIG can be generated according to a ray-equation method (e.g., Kirchhoff integral method) based on the four angle attributes. For example, the data processing apparatus can generate 5D ADCIG based on the example algorithms described with respect to Table 2, or in another manner.

At 1450, the generated ADCIG can be post-processed. For instance, the data processing apparatus can implement one or more of the various post-processing techniques such as those described with respect to FIGS. 6-8 and 10-13, for example, to enhance structure images, handle irregular illumination geometry of the VSP data.

Figure 15:
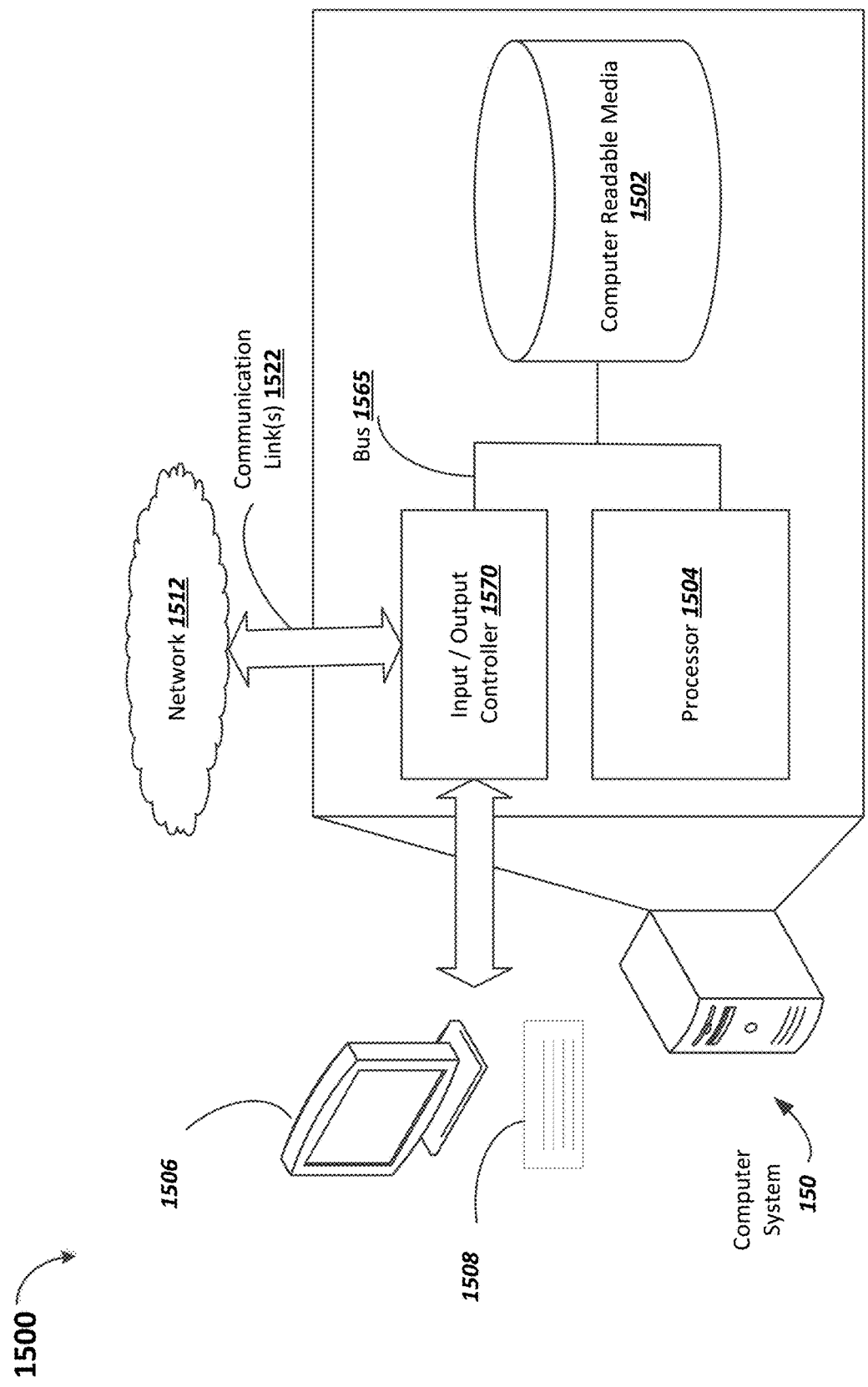
FIG. 15 is a schematic showing the example computer system of FIG. 1.

FIG. 15 illustrates a schematic of the example computer system 150 of FIG. 1. The example computer system 150 can be located at or near one or more well survey system or at a remote location. The example computer system 150 includes a data processing apparatus 1504 (e.g., one or more processors), a computer-readable medium 1502 (e.g., a memory), and input/output controllers 1570 communicably coupled by a bus 1565. The computer-readable medium can include, for example, a random access memory (RAM), a storage device (e.g., a writable read-only memory (ROM) and/or others), a hard disk, and/or another type of storage medium. The computer system 150 can be preprogrammed and/or it can be programmed (and reprogrammed) by loading a program from another source (e.g., from a CD-ROM, from another computer device through a data network, and/or in another manner). The input/output controller 1570 is coupled to input/output devices (e.g., the display device 1506, input devices 1508 (e.g., keyboard, mouse, etc.), and/or other input/output devices) and to a network 1512. The input/output devices receive and transmit data in analog or digital form over communication link(s) 1522 such as a serial link, wireless link (e.g., infrared, radio frequency, and/or others), parallel link, and/or another type of link.

The network 1512 can include any type of data communication network. For example, the network 1512 can include a wireless and/or a wired network, a Local Area Network (LAN), a Wide Area Network (WAN), a private network, a public network (such as the Internet), a WiFi network, a network that includes a satellite link, and/or another type of data communication network.

The operations described in this disclosure can be implemented as operations performed by a data processing apparatus on data stored on one or more computer-readable storage devices or received from other sources. The term "data processing apparatus" encompasses all kinds of apparatus, devices, and machines for processing data, including by way of example a programmable processor, a computer, a system on a chip, or multiple ones, or combinations, of the foregoing. The apparatus can include special purpose logic circuitry, for example, an FPGA (field programmable gate array) or an ASIC (application-specific integrated circuit). The apparatus can also include, in addition to hardware, code that creates an execution environment for the computer program in question, for example, code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (for example, one or more scripts stored in a markup language document), in a single file dedicated to the program in question, or in multiple coordinated files (for example, files that store one or more modules, sub-programs, or portions of code). A computer program can be deployed to be executed on one computer or on multiple computers that are located at one site or distributed across multiple sites and interconnected by a communication network.

While this disclosure contains many specific implementation details, these should not be construed as limitations on the scope of any implementations or of what may be claimed, but rather as descriptions of features specific to particular implementations of particular implementations. Certain features that are described in this disclosure in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

Thus, particular implementations of the subject matter have been described. Other implementations are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

The invention claimed is:

1. A computer-implemented method comprising:
receiving, by data processing apparatus, vertical seismic profile (VSP) data of a subterranean region, the VSP data comprising ray paths of incident rays from a surface source to a reflector and from the reflector to a borehole receiver, and comprising locations of the surface source, the reflector and the borehole receiver;
computing, by the data processing apparatus, four angle attributes for each image point based on the received VSP data;
generating, by the data processing apparatus, five-dimensional (5D) angle-domain common-image gathers (ADCIG) according to a ray-equation method based on the four angle attributes; and
migrating mode-converted energy PS-data in a time domain to avoid depth-to-time conversion in a post-processing process.

2. The method of claim 1, further comprising computing a multi-parameter Green's function based on ray-tracing.

3. The method of claim 2, wherein the computing multi-parameter Green's function comprises generating multi-parameter tables in separated files for imaging multi-component data.

4. The method of claim 2, further comprising infilling travel time shadow zones based on a ray-tracing algorithm.

5. The method of claim 1, wherein the ray-equation method comprises Kirchhoff integral method.

6. The method of claim 1, wherein the four angle attributes for each image point comprises a reflection-angle, an azimuth-angle of each reflection-angle, a dip-angle of each reflection-azimuth angle pair, and an azimuth-angle of each dip-angle for each reflection-azimuth angle pair.

7. The method of claim 1, further comprising computing ray parameters based on gradients of travel time fields computed based on the VSP data, and wherein the computing four angle attributes for each image point based on the received VSP data comprises computing the four angle attributes for each image point based on the ray parameters.

8. The method of claim 1, further comprising post-processing the generated ADCIG to enhance structure images.

9. The method of claim 8, wherein the post-processing the generated ADCIG comprises one or more of:
imaging down-going energies;
imaging up-going energies; or
imaging multi-component data, the multi-component data including one or more of PP-data, SS-data, or PS-data.

10. The method of claim 8, wherein the post-processing the generated ADCIG comprises performing interpretation-based post-processing based on one or more of horizon picks from surface seismic data or reflection angles estimated from well-logs or ray-based modeling methods.

11. A non-transitory computer-readable medium storing instructions executable by a computer system to perform operations comprising:
receiving, by data processing apparatus, vertical seismic profile (VSP) data of a subterranean region, the VSP data comprising ray paths of incident rays from a surface source to a reflector and from the reflector to a borehole receiver, and comprising locations of the surface source, the reflector and the borehole receiver;
computing, by the data processing apparatus, four angle attributes for each image point based on the received VSP data;
generating, by the data processing apparatus, five-dimensional (5D) angle-domain common-image gathers (ADCIG) according to a ray-equation method based on the four angle attributes; and
migrating mode-converted energy PS-data in a time domain to avoid depth-to-time conversion in a post-processing process.

12. The medium of claim 11, the operations further comprising computing a multi-parameter Green's function based on ray-tracing.

13. The medium of claim 12, wherein the computing multi-parameter Green's function comprises generating multi-parameter tables in separated files for imaging multi-component data.

14. The medium of claim 11, wherein the ray-equation method comprises Kirchhoff integral method.

15. The medium of claim 11, wherein the four angle attributes for each image point comprises a reflection-angle, a azimuth-angle of each reflection-angle, a dip-angle of each reflection-azimuth angle pair, and an azimuth-angle of each dip-angle for each reflection-azimuth angle pair.

16. The medium of claim 11, the operations further comprising post-processing the generated ADCIG to enhance structure images, wherein the post-processing the generated ADCIG comprises one or more of:
imaging down-going energies;
imaging up-going energies; or
imaging multi-component data, the multi-component data including one or more of PP-data, SS-data, or PS-data.

17. The medium of claim 11, the operations further comprising post-processing the generated ADCIG to enhance structure images, wherein the post-processing the generated ADCIG comprises performing interpretation-based post-processing based on one or more of horizon picks from surface seismic data or reflection angles estimated from well-logs or ray-based modeling methods.

18. A system comprising one or more computers that include:
memory operable to store vertical seismic profile (VSP) data of a subterranean region; and
data processing apparatus operable to:
receive vertical seismic profile (VSP) data of a subterranean region, the VSP data comprising ray paths of incident rays from a surface source to a reflector and from the reflector to a borehole receiver, and comprising locations of the surface source, the reflector and the borehole receiver;
compute four angle attributes for each image point based on the received VSP data;
generate five-dimensional (5D) angle-domain common-image gathers (ADCIG) according to a ray-equation method based on the four angle attributes; and
migrate mode-converted energy PS-data in a time domain to avoid depth-to-time conversion in a post-processing process.

19. The system of claim 18, further comprising computing a multi-parameter Green's function based on ray-tracing.

20. The system of claim 18, wherein the four angle attributes for each image point comprises a reflection-angle, an azimuth-angle of each reflection-angle, a dip-angle of each reflection-azimuth angle pair, and an azimuth-angle of each dip-angle for each reflection-azimuth angle pair.

21. The system of claim 18, the data processing apparatus being further operable to, based on the generated ADCIG:
image down-going energies;
image up-going energies; or image multi-component data, the multi-component data including one or more of PP-data, SS-data, or PS-data.

22. The system of claim 18, the data processing apparatus being further operable to, based on the generated ADCIG, perform interpretation-based post-processing based on one or more of horizon picks from surface seismic data or reflection angles estimated from well-logs or ray-based modeling methods.

* * * * *